(12) United States Patent
Kano

(10) Patent No.: US 9,830,689 B2
(45) Date of Patent: Nov. 28, 2017

(54) IMAGE PROCESSING APPARATUS THAT PERFORMS IMAGE RESTORATION PROCESSING, METHOD OF CONTROLLING THE SAME, AND STORAGE MEDIUM

(71) Applicant: CANON KABUSHIKI KAISHA, Tokyo (JP)

(72) Inventor: Akira Kano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 41 days.

(21) Appl. No.: 15/148,565

(22) Filed: May 6, 2016

(65) Prior Publication Data

US 2016/0335749 A1    Nov. 17, 2016

(30) Foreign Application Priority Data

May 11, 2015 (JP) .................. 2015-096510

(51) Int. Cl.
*G06T 5/00* (2006.01)
*G06T 5/20* (2006.01)
(Continued)

(52) U.S. Cl.
CPC ............ *G06T 5/005* (2013.01); *G06T 3/4015* (2013.01); *G06T 5/003* (2013.01); *G06T 5/006* (2013.01);
(Continued)

(58) Field of Classification Search
USPC ........................................................ 382/167
See application file for complete search history.

(56) References Cited

U.S. PATENT DOCUMENTS

| 5,879,284 A | 3/1999 | Tsujita |
|---|---|---|
| 8,098,948 B1 | 1/2012 | Tzur et al. |

(Continued)

FOREIGN PATENT DOCUMENTS

| JP | H10165365 A | 6/1998 |
|---|---|---|
| JP | 2010086138 A | 4/2010 |

OTHER PUBLICATIONS

Extended European Search Report issued in European Patent Application No. 16168696.9, dated Nov. 17, 2016.

(Continued)

*Primary Examiner* — Jerome Grant, II
(74) *Attorney, Agent, or Firm* — Rossi, Kimms & McDowell LLP

(57) ABSTRACT

An image processing apparatus capable of properly suppressing coloring caused by image restoration processing. A feature amount of a color of a pixel in an image before restoration processing is calculated as a first color feature amount. Image restoration processing is performed on the image using an image restoration filter. A feature amount of a color of a pixel in an image after restoration processing is calculated as a second color feature amount. High-frequency components included in the first color feature amount and the second color feature amount are attenuated according to a photographing condition at the time of photographing the image. Pixel values of the image after restoration processing are corrected based on the first color feature amount and the second color feature amount of which the high-frequency components are attenuated.

15 Claims, 17 Drawing Sheets

(51) Int. Cl.
*G06T 5/50* (2006.01)
*H04N 9/64* (2006.01)
*G06T 3/40* (2006.01)
*G06T 7/90* (2017.01)

(52) U.S. Cl.
CPC .............. *G06T 5/20* (2013.01); *G06T 5/50* (2013.01); *G06T 7/90* (2017.01); *H04N 9/646* (2013.01); *G06T 2207/10024* (2013.01); *G06T 2207/20024* (2013.01); *G06T 2207/20216* (2013.01)

(56) References Cited

U.S. PATENT DOCUMENTS

| | | |
|---|---|---|
| 8,605,163 B2 | 12/2013 | Hatakeyama |
| 2010/0079615 A1 | 4/2010 | Hatakeyama |
| 2011/0292257 A1 | 12/2011 | Hatakeyama |
| 2012/0154626 A1* | 6/2012 | Hatakeyama .......... H04N 9/646 348/223.1 |
| 2012/0200731 A1* | 8/2012 | Park ....................... H04N 9/045 348/223.1 |
| 2013/0041226 A1* | 2/2013 | McDowall ......... A61B 1/00009 600/166 |
| 2013/0050540 A1 | 2/2013 | Kano |
| 2013/0050544 A1 | 2/2013 | Kano |
| 2013/0076938 A1 | 3/2013 | Kano |
| 2015/0138398 A1* | 5/2015 | Hayashi ................ H04N 9/045 348/234 |
| 2015/0310592 A1* | 10/2015 | Kano ....................... H04N 1/58 382/167 |

OTHER PUBLICATIONS

Huang, "Image Processing: Some Insights", 1996 Cern School of Computing, Sep. 8, 1996, pp. 17-19, XP55312673.

\* cited by examiner

PSF BEFORE RESTORATION

PSF AFTER RESTORATION

PIXEL VALUES BEFORE RESTORATION

PIXEL VALUES AFTER RESTORATION

PIXEL VALUES BEFORE RESTORATION

PIXEL VALUES AFTER RESTORATION

COLOR DIFFERENCE BEFORE RESTORATION

COLOR DIFFERENCE AFTER RESTORATION

COMPARISON OF COLOR DIFFERENCES BEFORE AND AFTER RESTORATION (MOVING AVERAGE)

FIG. 6A

| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |

FIG. 6B

|   | G |   | G |   | G |
|---|---|---|---|---|---|
| G |   | G |   | G |   |
|   | G |   | G |   | G |
| G |   | G |   | G |   |
|   | G |   | G |   | G |
| G |   | G |   | G |   |

FIG. 6C

| R |   | R |   | R |   |
|---|---|---|---|---|---|
|   |   |   |   |   |   |
| R |   | R |   | R |   |
|   |   |   |   |   |   |
| R |   | R |   | R |   |
|   |   |   |   |   |   |

FIG. 6D

|   |   |   |   |   |   |
|---|---|---|---|---|---|
|   | B |   | B |   | B |
|   |   |   |   |   |   |
|   | B |   | B |   | B |
|   |   |   |   |   |   |
|   | B |   | B |   | B |

FIG. 6E

| G | G | G | G | G | G |
|---|---|---|---|---|---|
| G | G | G | G | G | G |
| G | G | G | G | G | G |
| G | G | G | G | G | G |
| G | G | G | G | G | G |
| G | G | G | G | G | G |

| 100 | 100 | 100 | 200 | 200 |
|-----|-----|-----|-----|-----|
| 100 | 100 | 100 | 200 | 200 |
| 100 | 100 | 100 | 200 | 200 |
| 100 | 100 | 100 | 200 | 200 |
| 100 | 100 | 100 | 200 | 200 |

FIG. 8A
G BEFORE INTERPOLATION

|   | 0 | 1 | 2 | 3 | 4 |
|---|---|---|---|---|---|
| 0 | 100 |  | 100 |  | 200 |
| 1 |  | 100 |  | 200 |  |
| 2 | 100 |  | 100 |  | 200 |
| 3 |  | 100 |  | 200 |  |
| 4 | 100 |  | 100 |  | 200 |

FIG. 8B
R BEFORE INTERPOLATION

|   | 0 | 1 | 2 | 3 | 4 |
|---|---|---|---|---|---|
| 0 |  | 100 |  | 200 |  |
| 1 |  |  |  |  |  |
| 2 |  | 100 |  | 200 |  |
| 3 |  |  |  |  |  |
| 4 |  | 100 |  | 200 |  |

FIG. 8C
B BEFORE INTERPOLATION

|   | 0 | 1 | 2 | 3 | 4 |
|---|---|---|---|---|---|
| 0 |  |  |  |  |  |
| 1 | 100 |  | 100 |  | 200 |
| 2 |  |  |  |  |  |
| 3 | 100 |  | 100 |  | 200 |
| 4 |  |  |  |  |  |

FIG. 8D
G AFTER LINEAR INTERPOLATION

| 100 | 100 | 100 | 175 | 200 |
|---|---|---|---|---|
| 100 | 100 | 125 | 200 | 200 |
| 100 | 100 | 100 | 175 | 200 |
| 100 | 100 | 125 | 200 | 200 |
| 100 | 100 | 100 | 175 | 200 |

FIG. 8E
R AFTER LINEAR INTERPOLATION

| 100 | 100 | 150 | 200 | 200 |
|---|---|---|---|---|
| 100 | 100 | 150 | 200 | 200 |
| 100 | 100 | 150 | 200 | 200 |
| 100 | 100 | 150 | 200 | 200 |
| 100 | 100 | 150 | 200 | 200 |

FIG. 8F
B AFTER LINEAR INTERPOLATION

| 100 | 100 | 100 | 150 | 200 |
|---|---|---|---|---|
| 100 | 100 | 100 | 150 | 200 |
| 100 | 100 | 100 | 150 | 200 |
| 100 | 100 | 100 | 150 | 200 |
| 100 | 100 | 100 | 150 | 200 |

FIG. 8G
G AFTER ADAPTIVE INTERPOLATION

| 100 | 100 | 100 | 200 | 200 |
|---|---|---|---|---|
| 100 | 100 | 100 | 200 | 200 |
| 100 | 100 | 100 | 200 | 200 |
| 100 | 100 | 100 | 200 | 200 |
| 100 | 100 | 100 | 200 | 200 |

FIG. 8H
R AFTER ADAPTIVE INTERPOLATION

| 100 | 100 | 100 | 200 | 200 |
|---|---|---|---|---|
| 100 | 100 | 100 | 200 | 200 |
| 100 | 100 | 100 | 200 | 200 |
| 100 | 100 | 100 | 200 | 200 |
| 100 | 100 | 100 | 200 | 200 |

FIG. 8I
B AFTER ADAPTIVE INTERPOLATION

| 100 | 100 | 100 | 200 | 200 |
|---|---|---|---|---|
| 100 | 100 | 100 | 200 | 200 |
| 100 | 100 | 100 | 200 | 200 |
| 100 | 100 | 100 | 200 | 200 |
| 100 | 100 | 100 | 200 | 200 |

IMAGE RESTORATION FILTER

LOW SENSITIVITY

HIGH SENSITIVITY

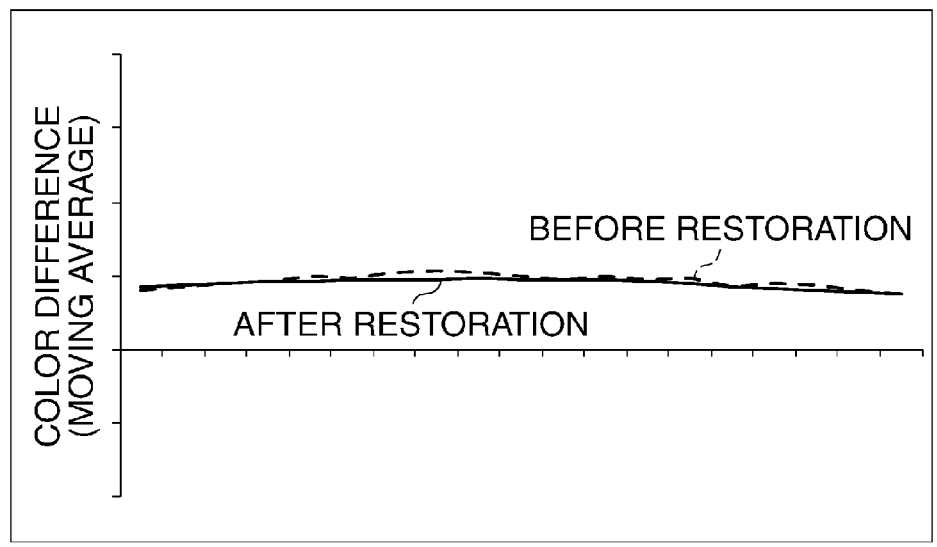

IMAGE PROCESSING APPARATUS THAT PERFORMS IMAGE RESTORATION PROCESSING, METHOD OF CONTROLLING THE SAME, AND STORAGE MEDIUM

BACKGROUND OF THE INVENTION

Field of the Invention

The present invention relates to an image processing apparatus that performs image restoration processing, a method of controlling the same, and a storage medium, and more particularly to a method of correcting a degraded image using image restoration processing.

Description of the Related Art

In general, when obtaining an image by photographing an object using an image pickup apparatus, such as a digital camera, the image is significantly degraded e.g. due to aberration of an image pickup optical system (i.e. the image is blurred). A blur component of an image is generally caused by spherical aberration, coma aberration, field curvature, astigmatic aberration, or the like, of the image pickup optical system. In an aberration-free state without any influence of diffraction, a light flux from one point of the object converges to one point again on an image pickup surface of an image pickup device. On the other hand, if any of the above-mentioned aberrations exists, light, which should converge to one point again on the image pickup surface, diverges to generate a blur component on an image thus formed.

The blur component generated on the image is optically defined by a point spread function (PSF). Although an image which is out of focus is also blurred, here, a blur of an image caused by aberration of the image pickup optical system even if the image is in focus is referred to as the "blur".

As for color bleeding on a color image, color bleeding caused by axial chromatic aberration of the image pickup optical system, spherical aberration of color, and comatic aberration of color can be referred to as different manners of blurring dependent on wavelengths of light. Further, as for color shift in a horizontal direction of an image as well, color shift caused by lateral chromatic aberration of the image pickup optical system can be referred to as positional shift or phase shift caused by different image pickup magnifications dependent on wavelengths of light.

An optical transfer function (OTF) obtained by Fourier transform of the above-mentioned PSF is a frequency component of aberration, and is represented by a complex number. An absolute value of the optical transfer function (OTF) (hereafter, the "optical transfer function" is simply referred to as the "OTF" as deemed appropriate), i.e. an amplitude component is referred to as the modulation transfer function (MTF), and a phase component is referred to as the phase transfer function (PTF).

These MTF and PTF are frequency characteristics of the amplitude component and the phase component of degradation of an image caused by aberration, respectively. The phase component is expressed as a phase angle by the following equation (1). Note that Re(OTF) and Im(OTF) express the real part and the imaginary part of the OTF, respectively:

$$PTF = \tan^{-1}\{Im(OTF)/Re(OTF)\} \quad (1)$$

The OTF in the image pickup optical system degrades the amplitude component and the phase component of an image, and hence in the degraded image, points of the object are asymmetrically blurred e.g. in a case where the degradation is caused by comatic aberration. Further, in a case where the degradation is caused by lateral chromatic aberration, the image formation position is shifted due to differences in image formation magnification between optical wavelengths, and when the light is received as the RGB color components according to spectral characteristics of light reflected from the object, this causes different image magnifications between the color components.

This causes shifts in image formation position not only between the red, green and blue (RGB) components, but also between the wavelengths in each color component. That is, the image is diverged by the phase shift. To be exact, the lateral chromatic aberration does not generate simple parallel color shift. However, description below will be given assuming that the color shift has the same meaning as the lateral chromatic aberration, unless otherwise specified.

As a method of correcting degradation in amplitude (MTF) and degradation in phase (PTF), for example, a method of correcting degradation using the OTF of the image pickup optical system is known. This method is referred to as image restoration or image recovery. In the following description, processing for correcting degradation of an image using the OTF of the image pickup optical system is referred to as image restoration processing or simply restoration processing.

Now, the outline of image restoration processing will be described. Let it be assumed that a degraded image is represented by g(x, y), the original image is represented by f(x, y), and the PSF obtained by performing inverse Fourier transform on the OTF is represented by h(x, y). In this case, the following equation (2) holds. Note that * represents convolution, and (x, y) represents coordinates on the image.

$$g(x,y) = h(x,y) * f(x,y) \quad (2)$$

When the equation (2) is converted to a frequency-based form by Fourier transform, this gives a form of the product, on a frequency-by-frequency basis, as represented by the following equation (3). Note that H represents a result of Fourier transform of the PSF, i.e. the OTF, and G and F represent results of Fourier transform of the degraded image g and the original image f, respectively. Values of (u, v) represent coordinates of a point on a two-dimensional frequency surface, i.e. a frequency.

$$G(u,v) = H(u,v) \cdot F(u,v) \quad (3)$$

To obtain the original image from the degraded image obtained through photographing, it is only required to divide both sides of the equation (3) by H, as represented by the following equation (4):

$$G(u,v)/H(u,v) = F(u,v) \quad (4)$$

By returning F(u, v) in the equation (4) by inverse Fourier transform to a real surface, it is possible to obtain the original image f(x, y) as a restored image.

Here, assuming that a result of inverse Fourier transform of 1/H in the equation (4) is represented by R, by performing convolution processing on the image on the real surface, as represented by the following equation (5), it is possible to similarly obtain the original image.

$$g(x,y) * R(x,y) = f(x,y) \quad (5)$$

R(x, y) in the equation (5) is referred to as an image restoration filter. The actual image has a noise component, and hence if the image restoration filter generated by the reciprocal of the OTF is used as mentioned above, the noise component is amplified together with the degraded image, and as a result, it is impossible to obtain a good image.

To prevent the noise component from being amplified, for example, there has been proposed a method of suppressing a restoration rate of high-frequency components of an image according to an intensity ratio between the image and noise, as in the Wiener filter. Further, as a method of correcting degradation of an image, caused by a color bleeding component, there has been proposed a method of correcting the color bleeding component by correcting the above-mentioned blur component such that the amount of blur is uniform for each of color components of the image.

Incidentally, the OTF changes according to the photographing state, such as a state of a zoom position, and a state of an aperture diameter of a diaphragm. Therefore, the image restoration filter used in image restoration processing is also required to be changed according to the photographing state. For example, in an endoscope for observing an inside of a living human body, there has been proposed a method of eliminating a blur of an image in a range outside an in-focus range of an image pickup section, using the PSF according to a fluorescent wavelength (see Japanese Patent Laid-Open Publication No. H10-165365). In this method, since the fluorescence is weak, an objective optical system having a small F-number is required. However, if the objective optical system having a small F-number is used, a depth of focus becomes shallow, and hence an in-focus image is obtained by performing image restoration processing for a range in which the object is out of focus.

As described above, image restoration processing is performed on an image obtained through photographing to thereby correct the above-mentioned various types of aberration, whereby it is possible to improve image quality. However, in performing photographing, the photographing state and the state of the image restoration filter do not always optimally match. For example, when photographing a three-dimensional object, such a problem occurs.

In the image pickup apparatus, photographing is performed by focusing on one surface of an object space using auto focus or manual focus. In doing this, in a case where the object is three-dimensional, the object distance is different depending on the angle of view. An in-focus object is relatively sharply photographed, but an out-of-focus object is photographed with an amount of blur dependent on the distance. In a case where information on the object distance is acquired only as to an in-focus point, an image restoration filter optimum for each angle of view in this object distance is selected or generated for use.

On an image after image restoration processing, the image restoration filter is optimum for an in-focus object, and hence it is possible to obtain desired sharpness. On the other hand, the image restoration filter is not optimum for an out-of-focus object, and hence although some effect of restoration is obtained, the image is still blurred.

On the other hand, it is conventionally known that a degree of blur dependent on the object distance produces excellent effects in expressing three-dimensionality of an object or expressing an object being watched in isolation from its background. For example, there is a method of expression in which by using a telephoto lens with a shallow depth of field, an image is expressed such that a main object is in focus and the background is intentionally blurred. In this case, also on the image after image restoration processing, it is desirable that the in-focus object is made sharper, and the out-of-focus object remains still blurred, and blurring expression is performed by using the above-mentioned image restoration method.

However, if the out-of-focus object is subjected to image restoration processing using an image restoration filter which is not optimum for the distance of the out-of-focus object, coloring sometimes occurs on the image. Note that the term "coloring" refers to a defect that a color which is not included in the object is found in the image after image restoration processing because a relationship of blurring between the respective color components on edge portions of the out-of-focus object is different before and after execution of image restoration processing.

Further, such coloring sometimes occurs not only in photographing of a three-dimensional object. More specifically, coloring occurs irrespective of whether or not the object is in focus, if a state of aberration in the actual photographing state and a state of aberration targeted by the image restoration filter are different e.g. due to manufacturing variation of the image pickup optical system or variation of spectrum of a light source in photographing.

As a method of suppressing the coloring described above, there has been proposed, for example, a method of correcting the color of an image after image restoration processing based on color information on the image before being subjected to image restoration processing. In this method, a change in color, caused by image restoration processing, is determined for each pixel of the image to thereby suppress coloring caused by image restoration processing.

For example, there has been proposed a method of correcting a signal value such that an amount of color difference is reduced, in a case where the color difference in an image after being subjected to image restoration processing becomes larger than before being subjected to image restoration processing (see e.g. Japanese Patent Laid-Open Publication No. 2010-86138).

As described above, by performing image restoration processing on an image obtained through photographing to reduce coloring which occurs e.g. on an image of an out-of-focus object, and correcting various types of aberration, it is possible to improve image quality.

However, as described hereinafter, when coloring suppression processing is performed according to a color difference before and after being subjected to restoration processing, color tone of the object in the image is sometimes changed or made inaccurate. Further, color tone is changed also depending on characteristics of the image pickup optical system and the sensitivity (ISO sensitivity) of the image pickup device.

However, the method described in Japanese Patent Laid-Open Publication No. 2010-86138 does not address these changes, and hence it is difficult to properly suppress coloring caused by image restoration processing.

SUMMARY OF THE INVENTION

The present invention provides an image processing apparatus that is capable of properly suppressing coloring caused by image restoration processing, a method of controlling the same, and a storage medium.

In a first aspect of the present invention, there is provided an image processing apparatus that restores an image quality of an image obtained based on an optical image formed on an image pickup device via an image pickup optical system, from degradation, comprising a first color feature amount calculation unit configured to calculate a feature amount of a color of a pixel in the image before a predetermined restoration processing, as a first color feature amount, an image restoration processing unit configured to perform the predetermined restoration processing on the image, using an image restoration filter, a second color feature amount calculation unit configured to calculate a feature amount of a color of a pixel in an image after the predetermined restoration processing, which is output from the image restoration processing unit, as a second color feature amount, an attenuation unit configured to attenuate high-frequency components included in the first color feature amount and the second color feature amount according to a photographing condition at a time of photographing of the image, and a correction unit configured to correct a pixel value in the image after the predetermined restoration processing, based on the first color feature amount and the second color feature amount of which the high-frequency components are attenuated by the attenuation unit.

In a second aspect of the present invention, there is provided an image processing apparatus that restores an image quality of an image obtained based on an optical image formed on an image pickup device via an image pickup optical system, from degradation, comprising a first color feature amount calculation unit configured to calculate a feature amount of a color of a pixel in the image before a predetermined restoration processing, as a first color feature amount, an image restoration processing unit configured to perform the predetermined restoration processing on the image, using an image restoration filter, a synthesis unit configured to generate a synthesized image by synthesizing the image before the predetermined restoration processing and an image after the predetermined restoration processing, which is output from the image restoration processing unit, according to a photographing condition at a time of photographing of the image, a second color feature amount calculation unit configured to calculate a feature amount of a color of a pixel in the synthesized image as a second color feature amount, and a correction unit configured to correct a pixel value in the synthesized image based on the first color feature amount and the second color feature amount.

In a third aspect of the present invention, there is provided a method of controlling an image processing apparatus that restores an image quality of an image obtained based on an optical image formed on an image pickup device via an image pickup optical system, from degradation, comprising calculating a feature amount of a color of a pixel in the image before a predetermined restoration processing, as a first color feature amount, performing the predetermined restoration processing on the image, using an image restoration filter, calculating a feature amount of a color of a pixel in an image after the predetermined restoration processing, as a second color feature amount, attenuating high-frequency components included in the first color feature amount and the second color feature amount according to a photographing condition at a time of photographing of the image, and correcting a pixel value in the image after the predetermined restoration processing, based on the first color feature amount and the second color feature amount of which the high-frequency components are attenuated by said attenuating.

In a fourth aspect of the present invention, there is provided a method of controlling an image processing apparatus that restores an image quality of an image obtained based on an optical image formed on an image pickup device via an image pickup optical system, from degradation, comprising calculating a feature amount of a color of a pixel in the image before a predetermined restoration processing, as a first color feature amount, performing the predetermined restoration processing on the image, using an image restoration filter, generating a synthesized image by synthesizing the image before the predetermined restoration processing and an image after the predetermined restoration processing, according to a photographing condition at a time of photographing of the image, calculating a feature amount of a color of a pixel in the synthesized image as a second color feature amount, and correcting a pixel value in the synthesized image based on the first color feature amount and the second color feature amount.

In a fifth aspect of the present invention, there is provided a non-transitory computer-readable storage medium storing a computer-executable program for executing a method of controlling an image processing apparatus that restores an image quality of an image obtained based on an optical image formed on an image pickup device via an image pickup optical system, from degradation, wherein the method comprises calculating a feature amount of a color of a pixel in the image before a predetermined restoration processing, as a first color feature amount, performing the predetermined restoration processing on the image, using an image restoration filter, calculating a feature amount of a color of a pixel in an image after the predetermined restoration processing, as a second color feature amount, attenuating high-frequency components included in the first color feature amount and the second color feature amount according to a photographing condition at a time of photographing of the image, and correcting a pixel value in the image after the predetermined restoration processing, based on the first color feature amount and the second color feature amount of which the high-frequency components are attenuated by said attenuating.

In a sixth aspect of the present invention, there is provided a non-transitory computer-readable storage medium storing a computer-executable program for executing a method of controlling an image processing apparatus that restores an image quality of an image obtained based on an optical image formed on an image pickup device via an image pickup optical system, from degradation, wherein the method comprises calculating a feature amount of a color of a pixel in the image before a predetermined restoration processing, as a first color feature amount, performing the predetermined restoration processing on the image, using an image restoration filter, generating a synthesized image by synthesizing the image before the predetermined restoration processing and an image after the predetermined restoration processing, according to a photographing condition at a time of photographing of the image, calculating a feature amount of a color of a pixel in the synthesized image as a second color feature amount, and correcting a pixel value in the synthesized image based on the first color feature amount and the second color feature amount.

According to the present invention, it is possible to properly suppress coloring caused by image restoration processing.

Further features of the present invention will become apparent from the following description of exemplary embodiments with reference to the attached drawings.

BRIEF DESCRIPTION OF THE DRAWINGS

FIGS. 1A to 1D are diagrams useful in explaining a G (green) component and an R (red) component of a PSF on a photographed image obtained via an image pickup optical system, in which FIG. 1A shows the PSF before image restoration processing, FIG. 1B shows the PSF after image restoration processing, FIG. 1C shows pixel values before image restoration processing, and FIG. 1D shows pixel values after image restoration processing.

FIGS. 2A to 2E are diagrams useful in explaining pixel values of a G signal and an R signal and a color difference between the G and R signals along one line in an image including noise components generated during photoelectric conversion performed by an image pickup device used in an image pickup apparatus before and after being subjected to restoration processing, in which FIG. 2A shows changes in the pixel values before restoration processing, FIG. 2B shows changes in the pixel values after restoration processing, FIG. 2C shows changes in the color difference before restoration processing, FIG. 2D shows changes in the color difference after restoration processing, and FIG. 2E shows a comparison of the color differences before and after restoration processing.

FIGS. 6A to 6E are diagrams useful in explaining an example (Bayer array) of an image (RAW image) input to the image restoration processor shown in FIG. 4, in which FIG. 6A shows an RGB plane (Bayer array) of the RAW image, FIGS. 6B to 6D show respective planes of color components, and FIG. 6E shows a state of a G component plane subjected to interpolation processing.

FIGS. 7A and 7B are diagrams useful in explaining an example of pixel interpolation on an edge portion using an adaptive pixel interpolation processing method, in which FIG. 7A shows changes in a pixel value (signal value) indicative of brightness on the edge portion, and FIG. 7B shows a pixel array in FIG. 7A.

FIGS. 8A to 8I are diagrams useful in explaining a pixel array in a RAW image obtained through photographing by an image pickup device having pixels of the Bayer array, in which FIG. 8A shows a G component plane before interpolation, FIG. 8B shows an R component plane before interpolation, FIG. 8C shows a B component plane before interpolation, FIG. 8D shows a G component plane after linear interpolation, FIG. 8E shows an R component plane after linear interpolation, FIG. 8F shows a B component plane after linear interpolation, FIG. 8G shows a G component plane after adaptive interpolation, FIG. 8H shows an R component plane after adaptive interpolation, and FIG. 8I shows a B component plane after adaptive interpolation.

FIGS. 9A and 9B are diagrams useful in explaining a parameter set according to a sensitivity of the image pickup device, in which FIG. 9A shows changes in the parameter set when the image pickup device is set to a high sensitivity, and FIG. 9B shows changes in parameter set when the image pickup device is set to a low sensitivity.

FIGS. 10A and 10B are diagrams useful in explaining an image restoration filter, in which FIG. 10A shows the image restoration filter, and FIG. 10B shows a relationship between a tap and a filter coefficient associated with the tap.

FIGS. 11A and 11B are diagrams useful in explaining image restoration filters used by the image restoration processor shown in FIG. 4, in which FIG. 11A shows an image restoration filter applied to a G component, and FIG. 11B shows an image restoration filter applied to R and B components.

FIGS. 12A and 12B are diagrams useful in explaining changes in pixel value (signal value) indicative of brightness in an edge portion in a case where development processing is performed on an image subjected to the image restoration process described with reference to FIG. 5 and an image not subjected to the image restoration process, in which FIG. 12A shows changes in brightness at a low sensitivity, and FIG. 12B shows changes in brightness at a high sensitivity.

FIG. 13E shows an increase/decrease rate (restoration gain) of the MTF caused by applying the image restoration filters.

FIG. 14 is a diagram showing moving averages of respective color differences before and after image restoration along one line in a predetermined area of an image which is photographed by the camera shown in FIG. 3 and has a lot of noise components.

FIGS. 15A to 15C are diagrams useful in explaining an example of a filter for changing a color difference bandwidth, in which FIG. 15A shows a first filter, FIG. 15B shows a second filter, and FIG. 15C shows a third filter.

FIGS. 18A and 18B are diagrams useful in explaining a synthesis parameter set according to a sensitivity of the image pickup device, in which FIG. 18A shows changes in the synthesis parameter set when the image pickup device is set to a high sensitivity, and FIG. 18B shows changes in the synthesis parameter set when the image pickup device is set to a low sensitivity.

DESCRIPTION OF THE EMBODIMENTS

The present invention will now be described in detail below with reference to the accompanying drawings showing embodiments thereof.

Here, before describing an image processing apparatus according to a first embodiment of the present invention, first, a description will be given of improvement of image quality by image restoration processing.

Figure 1A:
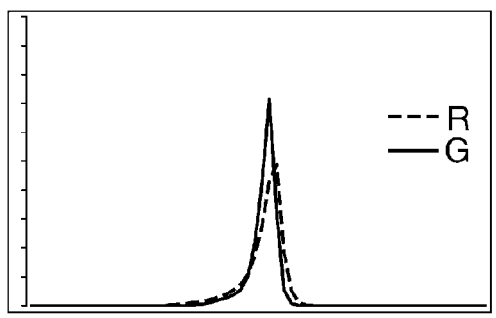
Figure 1B:
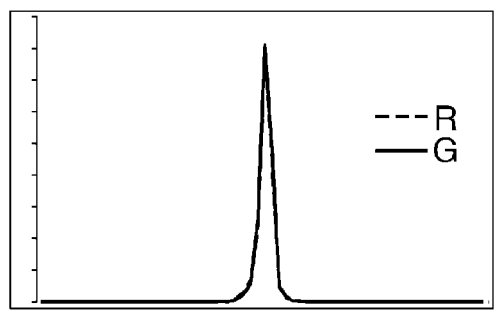
Figure 1C:
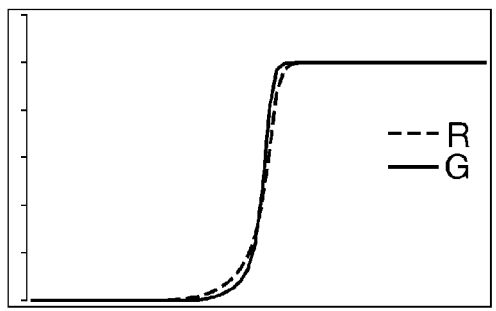
Figure 1D:
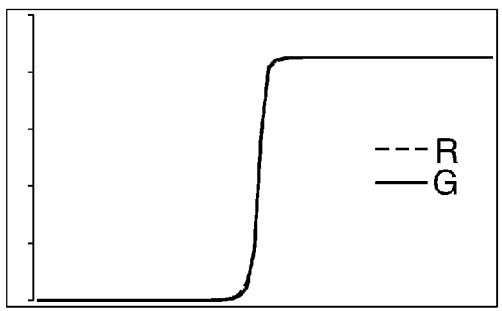

FIGS. 1A to 1D are diagrams useful in explaining a G (green) component and an R (red) component of a PSF on a photographed image obtained via an image pickup optical system, in which FIG. 1A shows the PSF before image restoration processing, FIG. 1B shows the PSF after image restoration processing, FIG. 1C shows pixel values before image restoration processing, and FIG. 1D shows pixel values after image restoration processing. Note that the horizontal axis and the vertical axis in each of FIGS. 1A and 1B represent space coordinates and an image intensity, respectively, and the horizontal axis and the vertical axis in each of FIGS. 1C and 1D represent coordinates of pixels and pixel values, respectively.

FIG. 1A shows the G component and the R component of the PSF, and from the shape of the PSF, illustrated therein, it is known that asymmetric aberration occurs. Further, the R component is lower in degree of sharpness than the G component and it is known from this fact that the image quality is largely degraded by aberration. FIG. 1C shows pixel values of the G component and the R component of an image obtained by photographing an edge portion of an object having colors of white and black. It is known from FIG. 1C that the R component is higher in degree of degradation than the G component, and that lines indicative of changes in the pixel values of the G component and the R component are different in inclination from each other.

As a result, color bleeding appears on the opposite sides of the edge portion due to influence of aberration. As for this color bleeding, even when color shift correction processing by pixel shift is performed, since the degree of inclination is different, it is impossible to completely correct color aberration. FIGS. 1B and 1D show results of image restoration processing performed on the PSF and the edge portion shown in FIGS. 1A and 1C, respectively.

As shown in FIG. 1B, the PSF is corrected such that its sharpness is increased, and the shapes of the G component and the R component are made to resemble each other. Further, it is known from FIG. 1D that the G component and the R component are made uniform in inclination at the edge portion, whereby color bleeding is corrected. That is, the amplitude component and the phase component of the optical transfer function (OTF) are corrected, whereby the asymmetrical blurring of the image is corrected.

As described above, by performing restoration processing on a photographed image, various types of aberration are corrected, whereby it is possible to improve the image quality of the photographed image. However, in photographing an image, noise generated during photoelectric conversion by the image pickup device causes noise components to be contained in the image. In general, as the image pickup device is set to a higher sensitivity, the noise components become larger. If coloring suppression processing is performed on an image containing many noise components caused by photoelectric conversion, according to a color difference before and after restoration processing, color tone of an object in the image is sometimes changed.

Figure 2A:
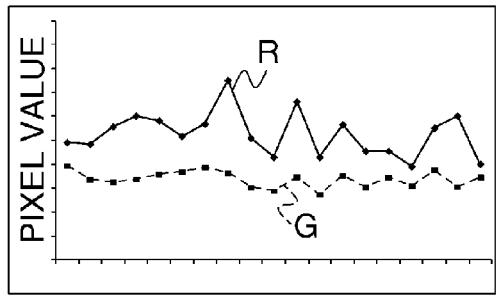
Figure 2B:
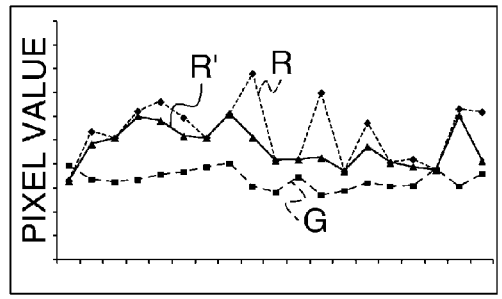
Figure 2C:
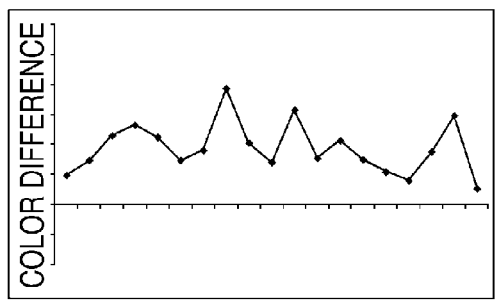
Figure 2D:
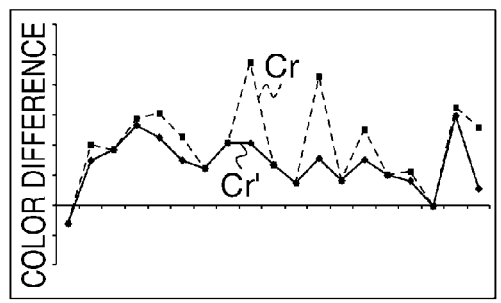
Figure 2E:
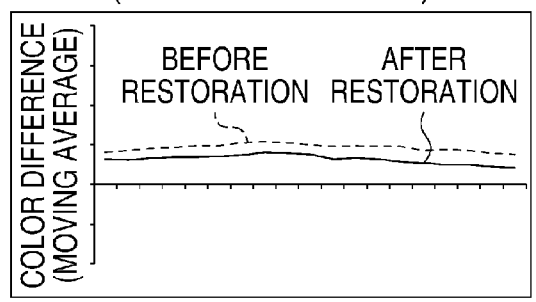

FIGS. 2A to 2E are diagrams useful in explaining pixel values of a G signal and an R signal and a color difference between the G and R signals along one line in an image including noise components generated during photoelectric conversion performed by the image pickup device before and after restoration processing, in which FIG. 2A shows changes in the pixel values before restoration processing, FIG. 2B shows changes in the pixel values after restoration processing, FIG. 2C shows changes in the color difference before restoration processing, FIG. 2D shows changes in the color difference after restoration processing, and FIG. 2E shows a comparison of the color differences before and after restoration processing.

In this example, although changes in brightness and color of the object are small, as shown in FIG. 2A, before image restoration processing, the pixel value changes due to a noise component. Then, if an image restoration filter having a large effect of phase correction of the OTF is used, changes in signal value caused by correcting the phase component are increased, so that changes in the color differences before and after restoration processing are increased.

That is, as shown in FIG. 2B, changes in the pixel values are not reduced after image restoration processing. Note that in FIG. 2B, "R" represents an R signal value after applying the image restoration filter, and "R'" represents a signal value on which correction for suppressing coloring has been performed.

FIG. 2C shows the color difference before image restoration processing, and the color difference here refers to a difference (R−G) between the G signal and the R signal. FIG. 2D shows the color difference after image restoration processing, in which "Cr" represents the color difference after applying the image restoration filter, and "Cr'" represents the color difference on which correction for suppressing coloring has been performed. In this example, the R signal is corrected with respect to a pixel whose color difference is larger after image restoration processing than before image restoration processing, such that the amount of color difference is reduced.

FIG. 2E shows moving averages of the color difference for the purpose of comparison between the respective color differences before and after image restoration processing. Although in image processing performed by an image pickup apparatus, so-called color difference smoothing processing is performed, in this example, color tone of an image of an object, as viewed, is compared using moving averages as a simplified method.

As shown in FIG. 2E, when correction for suppressing coloring is performed, a change in the color tone occurs between before and after image restoration processing. Further, the change in the color tone shows a tendency made different by the amount of noise components. That is, the amount of change in color tone is also changed depending on the sensitivity (ISO sensitivity) of the image pickup device.

Figure 3:
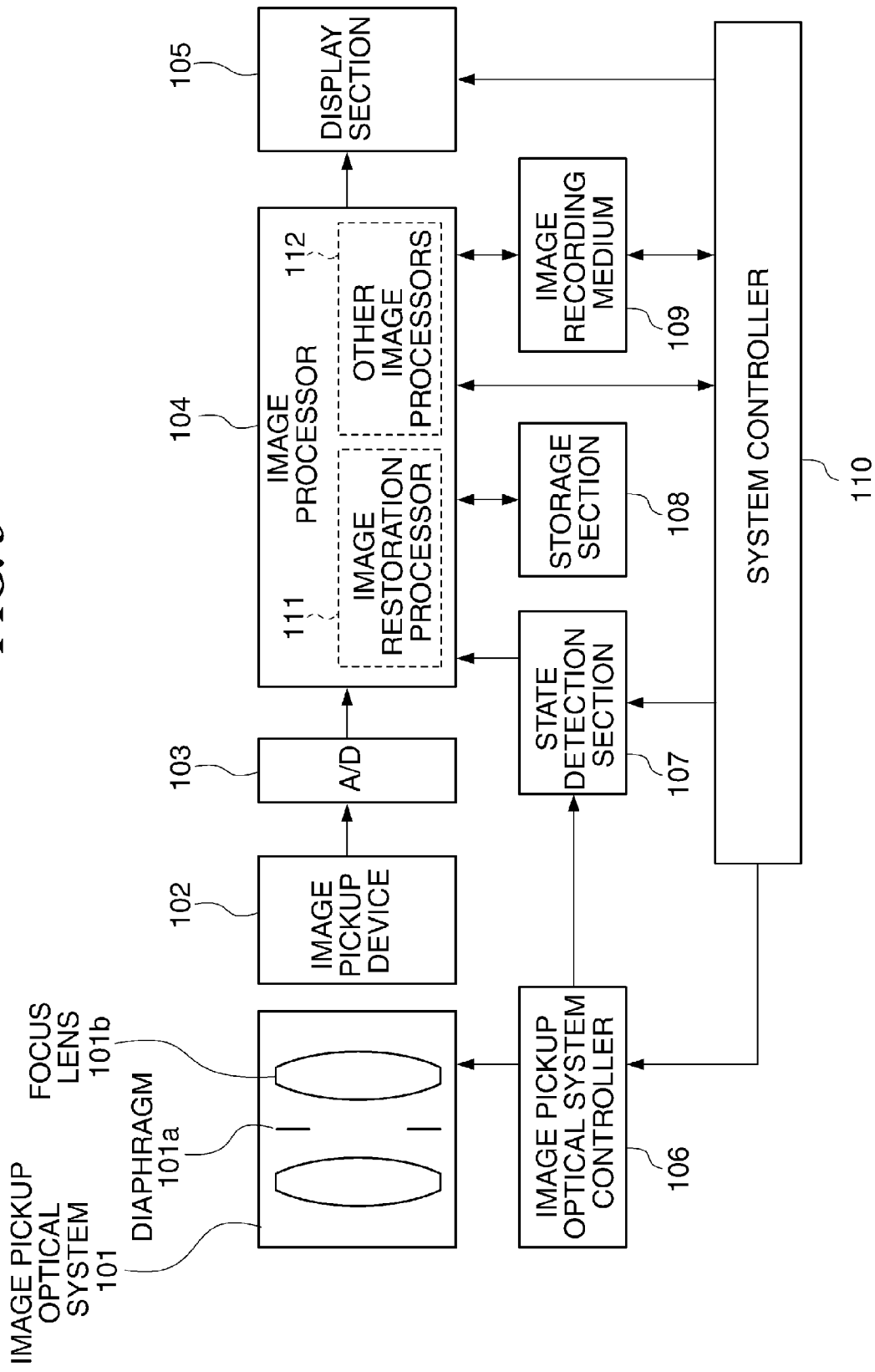
FIG. 3 is a block diagram of a digital camera as an image pickup apparatus equipped with an image processing apparatus according to a first embodiment of the present invention.

FIG. 3 is a block diagram of an image pickup apparatus equipped with the image processing apparatus according to the first embodiment of the present invention.

The image pickup apparatus shown in FIG. 3 by way of example is a digital camera (hereinafter simply referred to as the camera), and includes an image pickup optical system 101. The image pickup optical system 101 is provided with at least a diaphragm 101a and a focus lens 101b. An image pickup device 102, such as a CMOS image sensor, is disposed downstream of the image pickup optical system 101, and an optical image (object image) incident through the image pickup optical system 101 is formed on the image pickup device 102.

The image pickup device 102 photoelectrically converts the optical image to electrical signals, and outputs the electrical signals (analog signals) corresponding to the optical image. Then, the analog signals are converted to digital signals by an analog to digital (A/D) converter 103, and are input to an image processor 104.

The image processor 104 includes an image restoration processor 111 that performs image restoration processing for restoring image quality which has been degraded, and other image processors 112 that perform predetermined processing. The image processor 104 obtains photographing state information indicative of a photographing state of the camera from a state detection section 107. The state detection section 107 may be configured to obtain the photographing state information directly from a system controller 110. Additionally or alternatively, the state detection section 107 may be configured to obtain photographing state information concerning the image pickup optical system 101 from an image pickup optical system controller 106, referred to hereinafter.

Next, the image processor 104 selects image restoration filters from a storage section 108 according to the photographing state information. The image processor 104 performs white balance processing on the digital signal, and thereafter performs image restoration processing by the image restoration processor 111. Specifically, the image restoration processor 111 performs image restoration processing for applying the image restoration filters to digital signals (i.e. an image). The processing performed by the image restoration processor 111 will be described hereinafter.

The storage section 108 may be configured not to record the image restoration filters themselves, but to record OTF information concerning an optical transfer function (OTF) necessary for generating the image restoration filters. In this case, the image restoration processor 111 selects OTF information from the storage section 108 according to the photographing state information, and generates image restoration filters based on the selected OTF information. Then, the image processor 111 performs image restoration processing on the image using the generated image restoration filters.

The other image processors 112 perform gamma correction, color balance adjustment, and so on, as predetermined processing, on the image subjected to image restoration processing, and generates an image file (hereinafter also referred to as the output image), such as a JPEG file.

The image processor 104 stores the output image in an image recording medium 109 in a predetermined format. Further, the image processor 104 performs display processing on the image subjected to image restoration processing to thereby display a display image on a display section 105.

Note that the image processor 104 may display the display image on the display section 105 without performing image restoration processing, or may display the image subjected to simplified image restoration processing on the display section 105.

The system controller 110 controls the overall operation of the camera. For example, the system controller 110 causes the image pickup optical system controller 106 to drive the image pickup optical system 101. In doing this, the image pickup optical system controller 106 controls an opening diameter (aperture diameter) of the diaphragm 101a according to a photographing state setting of the F number. Further, the image pickup optical system controller 106 controls the driving of the focus lens 101b along the optical axis according to an object distance using an auto focus (AF) mechanism (not shown). Note that according to a user's operation, the image pickup optical system controller 106 may control the driving of the focus lens 101b using a manual focus mechanism (not shown).

Although not shown, the image pickup optical system 101 may be provided with an optical device, such as a low pass filter and an infrared cut filter. When using an optical device that influences the OTF characteristics, such as a low pass filter, it is sometimes required to take into account the characteristics of the optical device when generating the image restoration filters.

Further, when using the infrared cut filter, this filter has an influence on the respective PSFs (point spread functions) of the RGB channels, each of which is a value of integral of the PSF of spectral wavelengths, particularly on the PSF of the R channel, and hence it is also necessary to take this into account when generating the image restoration filters. Although in the illustrated example, the image pickup optical system 101 is shown as a component integrated in the camera, the image pickup optical system 101 may be of an interchangeable type, as in the case of use in a single-lens reflex camera.

Figure 4:
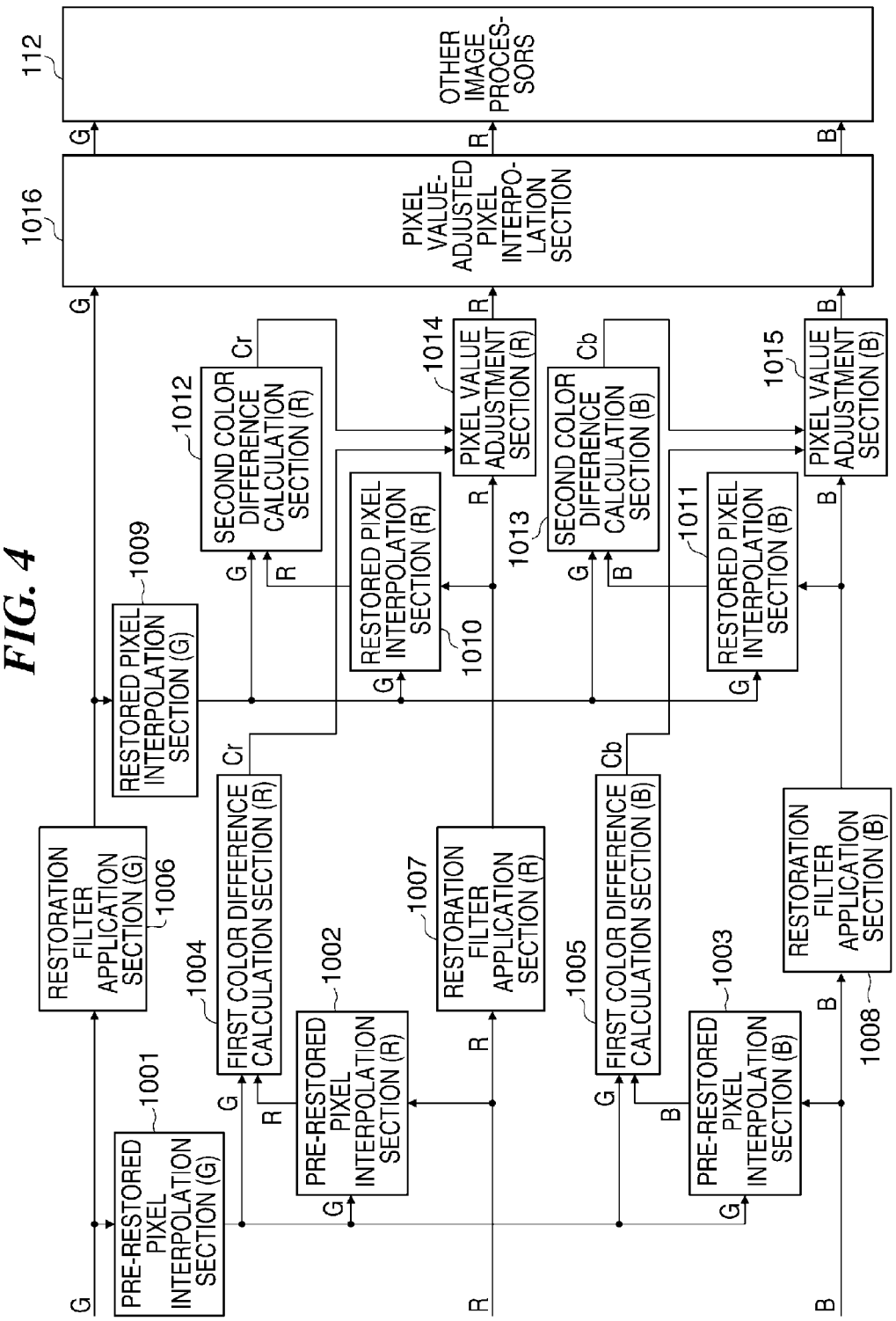
FIG. 4 is a block diagram of an image restoration processor appearing in FIG. 3.

FIG. 4 is a block diagram of an image restoration processor 111 appearing in FIG. 3. Further, FIG. 5 is a flowchart of an image restoration process performed by the image restoration processor 111 shown in FIG. 4.

Figure 5:
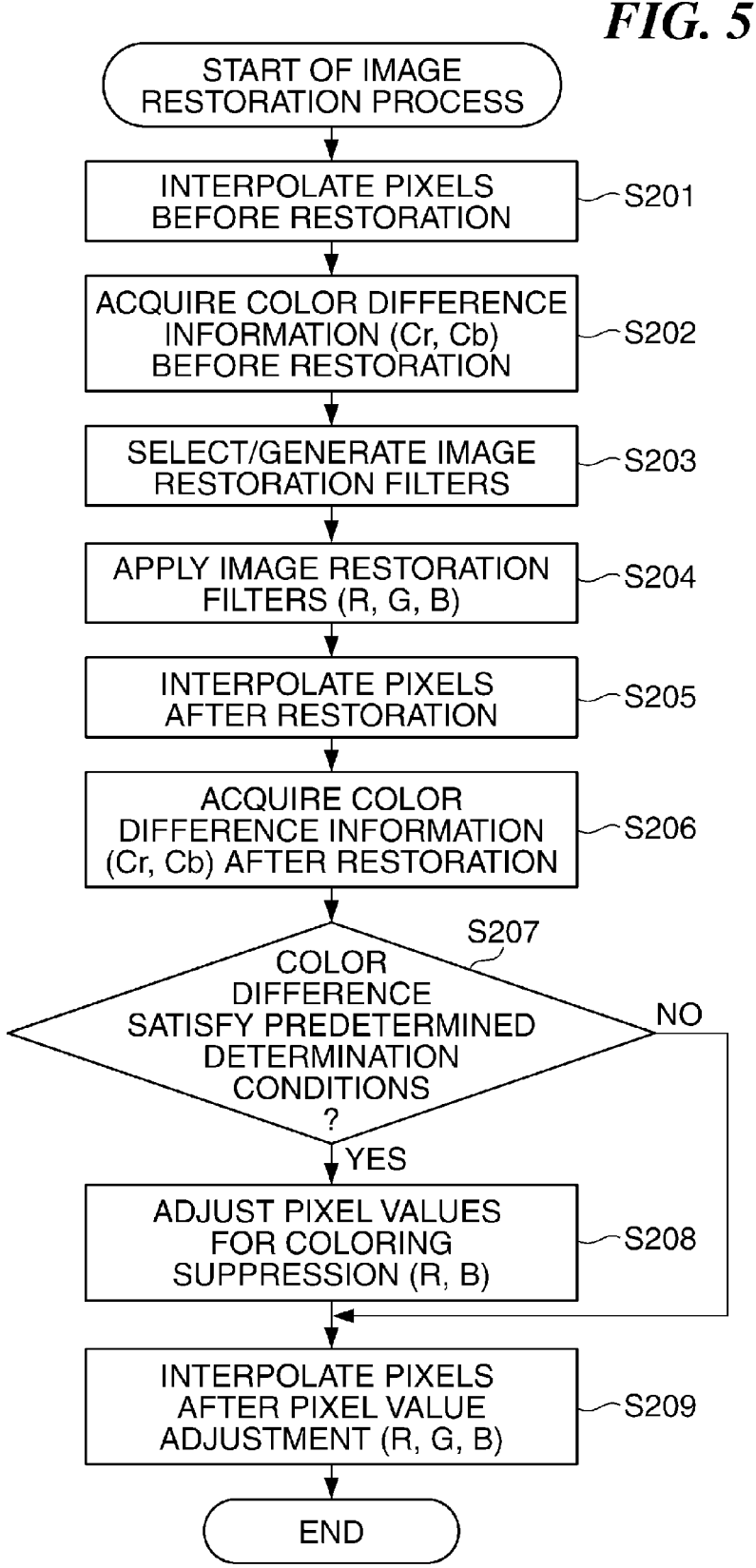
FIG. 5 is a flowchart of an image restoration process performed by the image restoration processor shown in FIG. 4.

Further, FIGS. 6A to 6E are diagrams useful in explaining an example (Bayer array) of an image (RAW image) input to the image restoration processor 111 shown in FIG. 5, in which FIG. 6A shows an RGB plane (Bayer array) of the RAW image, FIGS. 6B to 6D show respective planes of color components, and FIG. 6E shows a state of a G component plane subjected to interpolation processing.

First, referring to FIGS. 6A to 6E, the RAW image composed of pixels each associated with a single-color component (see FIG. 6A) is input to the image restoration processor 111. Here, each single-color component plane has information in a partially missing state (see FIGS. 6B to 6D). Then, as described hereinafter, pixel interpolation is performed on the G component plane, whereby information on the G component is provided for each pixel (see FIG. 6E).

Next, the image restoration process will be described with reference to FIGS. 4 to 6E. As described above, the RAW image shown in FIG. 6A is input to the image restoration processor 111. When the image restoration process is started, the image restoration processor 111 performs pixel interpolation processing on the RAW image (step S201: pixel interpolation before restoration).

In the step S201, first, a pre-restored pixel interpolation section (G) 1001 performs pixel interpolation for the G component plane, and outputs the G component plane after interpolation. By performing pixel interpolation processing, the G component plane has its information changed from the partially missing state shown in FIG. 6B to a state shown in FIG. 6E in which information on the G component is provided for each pixel. Then, the G component plane after interpolation is given to a pre-restored pixel interpolation section (R) 1002 and a pre-restored pixel interpolation section (B) 1003. The pre-restored pixel interpolation section (R) 1002 and the pre-restored pixel interpolation section (B) 1003 perform pixel interpolation for the R component and the B component, respectively, whereby the R component plane and the B component plane each have information on the R component or the B component provided for each pixel, respectively. Hereinafter, the R component plane and the B component plane output from the pre-restored pixel interpolation section (R) 1002 and the pre-restored pixel interpolation section (B) 1003 after interpolation are referred to as the R component plane after interpolation and the B component plane after interpolation, respectively.

For pixel interpolation processing performed by the image pickup device having the Bayer array, various pixel interpolation methods are known. A generally employed one is an adaptive pixel interpolation processing method for generating interpolated pixels using pixel information of the other color components of the surrounding pixels. For example, to generate an R pixel value for one pixel by performing interpolation processing, a method of interpolating the R pixel value is determined based on the G and B components of the surrounding pixels. Differently from a method of simply linearly interpolating one color component, adaptive pixel interpolation processing can reduce generation of a false color and lowering of sharpness, caused by interpolation processing.

Figures 7A, 7B:
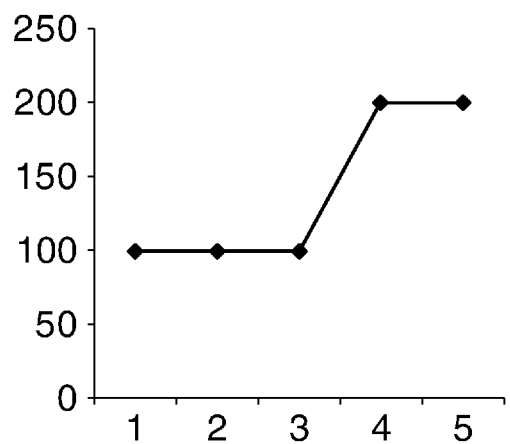

FIGS. 7A and 7B are diagrams useful in explaining the example of pixel interpolation on an edge portion by the adaptive pixel interpolation processing method, in which FIG. 7A shows changes in pixel value (signal value) indicative of brightness on the edge portion, and FIG. 7B shows a pixel array in FIG. 7A.

If the illustrated edge portion is achromatic, when the RGB values in the respective pixels of the image pickup device are obtained, the respective color components of RGB have the same value. In the illustrated example in FIG. 7B, the pixels are in a pixel array composed of the pixel values 100 and 200.

FIGS. 8A to 8I are diagrams useful in explaining the pixel array of the RAW image obtained through photographing using the image pickup device having the Bayer array, in which FIG. 8A shows a G component plane before interpolation, FIG. 8B shows an R component plane before interpolation, FIG. 8C shows a B component plane before interpolation, FIG. 8D shows a G component plane after linear interpolation, FIG. 8E shows an R component plane after linear interpolation, FIG. 8F shows a B component plane after linear interpolation, FIG. 8G shows a G component plane after adaptive interpolation, FIG. 8H shows an R component plane after adaptive interpolation, and FIG. 8I shows a B component plane after adaptive interpolation.

In actuality, the RAW image obtained through photographing by the image pickup device having the Bayer array has one color component for each pixel, and hence when values are extracted for each color component, pixel arrays are as in respective color component planes shown in FIGS. 8A to 8C. In the pixel array of each color component plane, pixels indicated by black are those for which interpolation processing is required to be performed. In this case, ideally, the respective color components subjected to pixel interpolation processing have the pixel values shown in FIG. 7B.

In the following description, the pixel arrays shown in FIGS. 8A to 8C are represented by $G(x, y)$, $R(x, y)$, and $B(x, y)$, respectively. In this expression, x represents a coordinate in a horizontal direction, and y represents a coordinate in a vertical direction, both of which are values within a range of 0 to 4.

As described above, the pre-restored pixel interpolation section (G) 1001 performs pixel interpolation processing for the G component. Here, for the G component shown in FIG. 8A, the pre-restored pixel interpolation section (G) 1001 performs adaptive pixel interpolation processing for generating an interpolated pixel using pixel information of the other color components of the surrounding pixels. In the following description, adaptive pixel interpolation processing is simply referred to as adaptive interpolation.

To generate the G component for a pixel having a value of the R component (for example, to generate G(1, 2)), the following equations (6) to (9) are used:

$$H\_DIFF=\{R(x,y)-R(x-2,y)\}+\{R(x,y)-R(x+2,y)\} \quad (6)$$

$$V\_DIFF=\{R(x,y)-R(x,y-2)\}+\{R(x,y)-R(x,y+2)\} \quad (7)$$

$$IF(|H\_DIFF|>|V\_DIFF|)\{G(x,y)=(G(x,y-1)+G(x,y+1))/2\} \quad (8)$$

$$ELSE\{G(x,y)=(G(x-1,y)+G(x+1,y))/2\} \quad (9)$$

In pixel interpolation for the R component before interpolation shown in FIG. 8B, the pre-restored pixel interpolation section (R) 1002 performs adaptive pixel interpolation processing for generating an interpolated pixel using pixel information of the other color components of the surrounding pixels. In this case, the pre-restored pixel interpolation section (R) 1002 performs adaptive pixel interpolation processing for the R component before interpolation using the G component after interpolation in the following manner.

To generate the R component for a pixel in a case where adjacent pixels on horizontally opposite sides have values (for example, to generate R(2, 0)), the following equations (10) and (11) are used:

$$Cr=\{R(x-1,y)-G(x-1,y)+R(x+1,y)-G(x+1,y)\}/2 \quad (10)$$

$$R(x,y)=G(x,y)+Cr \quad (11)$$

To generate the R component for a pixel in a case where adjacent pixels on vertically opposite sides have values (for example, to generate R(1, 1)), the following equations (12) and (13) are used:

$$Cr=\{R(x,y-1)-G(x,y-1)+R(x,y+1)-G(x,y+1)\}/2 \quad (12)$$

$$R(x,y)=G(x,y)+Cr \quad (13)$$

To generate the R component for a pixel in a case where adjacent pixels on diagonally opposite sides have values (for example, to generate R(2, 1)), the following equations (14) and (15) are used:

$$Cr=\{R(x-1,y-1)-G(x-1,y-1)+R(x+1,y-1)-G(x+1,y-1)+R(x-1,y+1)-G(x-1,y+1)+R(x+1,y+1)-G(x+1,y+1)\}/4 \quad (14)$$

$$R(x,y)=G(x,y)+Cr \quad (15)$$

The pre-restored pixel interpolation section (R) 1002 thus performs adaptive interpolation for the R component by interpolating the R component with the color difference information (R-G) acquired from the adjacent pixels.

In a similar manner to the R component before interpolation, the pre-restored pixel interpolation section (B) 1003 performs adaptive pixel interpolation processing on the B component before interpolation shown in FIG. 8C, using pixel information of the other color components of the surrounding pixels, for generating an interpolated pixel. In this case, the pre-restored pixel interpolation section (B) 1003 performs adaptive pixel interpolation processing for the B component before interpolation using the G component after interpolation. That is, the pre-restored pixel interpolation section (B) 1003 performs adaptive pixel interpolation based on the color difference information (B-G) obtained from the adjacent pixels.

FIGS. 8G, 8H, and 8I show the G component plane, the R component plane, and the G component plane, on which adaptive pixel interpolation has been performed as described above, respectively. Further, for the purpose of comparison, FIGS. 8D to 8F show examples of the respective color planes of the G component plane, the R component plane, and the G component plane, on which general linear interpolation has been performed, instead of performing adaptive interpolation, respectively.

In the case where linear interpolation has been performed, the pixel values other than "100" and "200" are generated, and the sharpness is reduced with respect to the pixel array shown in FIG. 7B. On the other hand, in the case where adaptive interpolation has been performed, the pixel arrays shown in FIGS. 8G to 8I are equal in pixel value between the components of R, G, and B, and all coincide with the pixel array shown in FIG. 7B.

As described above, by performing adaptive interpolation for generating an interpolated pixel using pixel information of other color components of surrounding pixels, it is possible to generate an image in which sharpness is not reduced with respect to the pixel array shown in FIG. 7B.

Note that pixel interpolation processing performed by the pre-restored pixel interpolation section (G) 1001, the pre-restored pixel interpolation section (R) 1002, and the pre-restored pixel interpolation section (B) 1003 is not limited to the above-described example, but any other suitable interpolation method may be employed.

If reduction of calculation load of interpolation processing is considered more important than the accuracy in interpolation processing, interpolation processing for the R component and the B component may be performed using general linear interpolation without using the G component after interpolation. When linear interpolation is used, it is not necessary to input a G component plane after interpolation, output from the pre-restored pixel interpolation section (G) 1001, to the pre-restored pixel interpolation section (R) 1002 and the pre-restored pixel interpolation section (B) 1003.

Referring again to FIGS. 4 and 5, a first color difference calculation section (R) 1004 calculates first color difference information (Cr) based on the G component plane after interpolation and the R component plane after interpolation. Similarly, a first color difference calculation section (B) 1005 calculates first color difference information (Cb) based on the G component plane after interpolation and the B component plane after interpolation (step S202). Note that in this calculation, the color difference is defined as a difference in signal value from the G component as a reference color. Therefore, the color differences are calculated by the following respective equations (16) to (19):

$$C1r(x, y) = R(x, y) - G(x, y) \quad (16)$$

$$C1b(x, y) = B(x, y) - G(x, y) \quad (17)$$

$$C1r'(x, y) = \frac{\sum_{i=-k}^{k} \sum_{j=-k}^{k} C1r(x+i, y+j)}{(2k+1)^2} \quad (18)$$

$$C1b'(x, y) = \frac{\sum_{i=-k}^{k} \sum_{j=-k}^{k} C1b(x+i, y+j)}{(2k+1)^2} \quad (19)$$

In the equations (16) to (19), (x, y) represents coordinate values on the image, and C1r, C1b, C1r', and C1b' represent the color difference of the R component and the B component with respect to the G component, respectively. Note that the first color difference information (Cr) indicates the above-mentioned C1r and C1r', and the first color difference information (Cb) indicates the above-mentioned C1b and C1b'.

In the equations (18) and (19), a parameter k represents the size of an area from which the color difference information is acquired. When the parameter k is equal to 0, the color difference information is acquired for each one pixel. When the parameter k is a positive integer, an average value of the color differences of an area corresponding to the value of the parameter k is acquired.

Figure 9A:
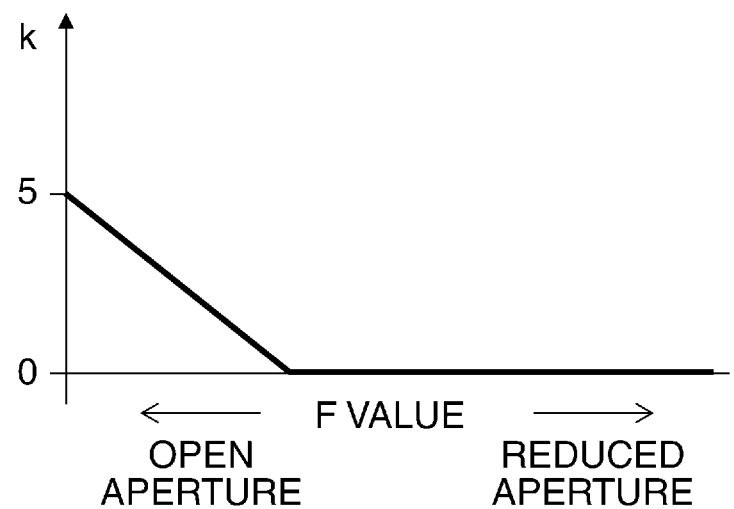
Figure 9B:
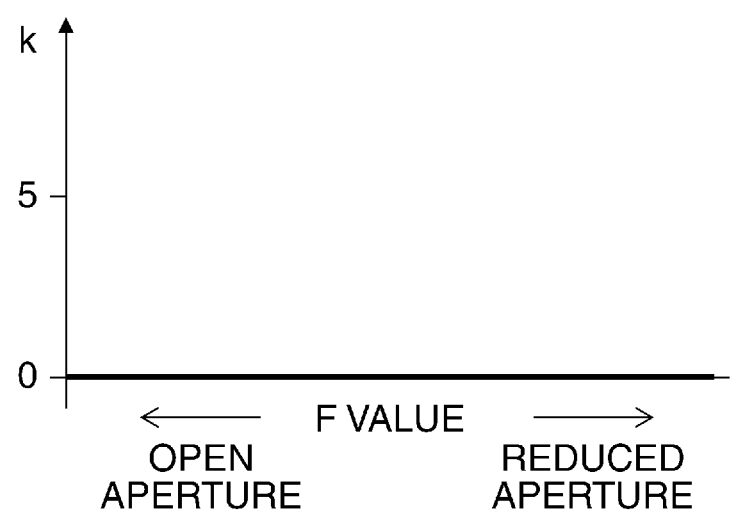

FIGS. 9A and 9B are diagrams useful in explaining the parameter k set according to a sensitivity of the image pickup device, in which FIG. 9A shows changes in the parameter k set when the image pickup device is set to a high sensitivity, and FIG. 9B shows changes in the parameter k set when the image pickup device is set to a low sensitivity.

Referring to FIG. 9A, when the image pickup device is set to a high sensitivity, noise components are increased. In this case, the parameter k changes according to an aperture value (F value) of the image pickup optical system. Then, when the F value is set to a smaller value, which makes the aperture of the diaphragm 101a more open, than a predetermined value, the parameter k linearly increases as the F value becomes smaller (the aperture is made more open). On the other hand, when the F value is set to be a larger value, which makes the aperture more closed, than the predetermined value, the parameter k is held at 0.

As described hereinabove, if the amount of phase correction of the OTF is large in image restoration processing, it is impossible to properly perform coloring suppression processing in an image having a lot of noise components. Further, an influence of lateral chromatic aberration including e.g. comatic aberration, which is generally asymmetric aberration, tends to be larger as the aperture is made more open. For this reason, the effect of phase correction in image restoration processing also tends to be larger as the aperture is made more open.

Therefore, the parameter k is set according to the aperture value (F value), and as described hereinafter, the color difference is set, not on a pixel-by-pixel basis, but to an average value of color differences of pixels in an area adjacent thereto.

If an influence of the noise component is small as a result of setting the image pickup device to a low sensitivity, the parameter k is always set to 0 irrespective of the F value, as shown in FIG. 9B. However, among compact camera units, there is a type in which an influence of noise components is not reduced even when the image pickup device is set to a low sensitivity. In this case, it is only required that the parameter k is set according to the F value irrespective of the sensitivity of the image pickup device.

Referring again to FIGS. 4 and 5, a restoration filter application section (G) 1006, a restoration filter application section (R) 1007, and a restoration filter application section (B) 1008 select respective image restoration filters suitable for the photographing condition (step S203). In doing this, each selected image restoration filter may be corrected as required. For example, to reduce the number of data items concerning the image restoration filters, which are caused to be recorded in the storage section 108 in advance, data items may be discretely recorded, and before performing image restoration processing, these data items may be corrected according to the photographing condition to thereby generate the image restoration filters.

Further, as mentioned hereinabove, the image restoration filters adapted to the photographing condition may be generated according to data concerning the OTF necessary for generating the image restoration filters.

Then, the restoration filter application section (G) 1006, the restoration filter application section (R) 1007, and the restoration filter application section (B) 1008 perform convolution processing on pixels of the color components (G, R, B) using the image restoration filters, respectively (step S204). This makes it possible to correct the asymmetry of aberration caused in the image pickup optical system 101 and eliminate or reduce the blur components of the image.

Figure 10A:
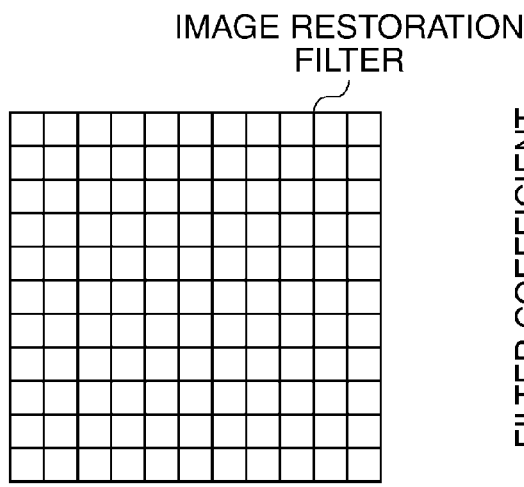
Figure 10B:
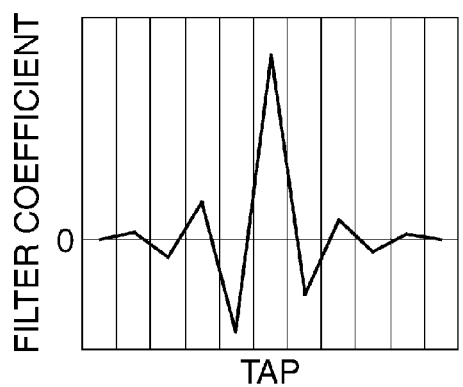

FIGS. 10A and 10B are diagrams useful in explaining an image restoration filter, in which FIG. 10A shows the image restoration filter, and FIG. 10B shows a relationship between taps (terms to be each multiplied by a filter coefficient in the difference equation representative of the filter) and filter coefficients associated with the taps.

The image restoration filter shown in FIG. 10A is an example of an image restoration filter which is to be applied to each color plane of the image in which the pixels each have an associated one of the RGB color components. In the image restoration filter, the number of taps can be determined according to an amount of aberration of the image pickup optical system 101, and the illustrated example shows a two-dimensional filter having 11×11 taps. Each tap of the image restoration filter corresponds to one pixel of the image, and convolution processing is performed in the image restoration process.

As shown in FIG. 10A, a two-dimensional filter which is divided into not less than 100 taps is set as the image restoration filter, whereby it is possible to perform restoration processing even for aberration extending from an image formation position in a large area, such as spherical aberration, coma aberration, axial chromatic aberration, and non-axial color flare, which are caused in the image pickup optical system 101.

In FIG. 10A, a filter coefficient of each tap is omitted. FIG. 10B shows filter coefficients of the image restoration filter shown in FIG. 10A, and this image restoration filter can be obtained, as described above, by calculating or measuring the OTF of the image pickup optical system 101, and subjecting the reciprocal of the OTF to inverse Fourier transform. In general, it is necessary to take into account an influence of noise components, and hence a method of generating the Wiener filter or an image restoration filter related to the Wiener filter may be selected and used.

Further, the OTF can also include not only factors of the image pickup optical system 101 but also factors that degrade image data input to the image processor 104. For example, the low pass filter suppresses the high-frequency components for the frequency characteristics of the OTF. Further, the shape and aperture ratio of the pixel aperture of the image pickup device also influence the frequency characteristics. Besides, spectral characteristics of a light source and spectral characteristics of various wavelength filters influence the OTF. It is desirable to generate the image restoration filter based on an OTF in a broad sense, in which these factors are included.

Further, in a case where the image is a color image in the RGB format, it is only required to generate three image restoration filters associated with the respective color components of R, G, and B. The image pickup optical system 101 has color aberration, which makes blurring different between the color components, and hence the image restoration filter of each color component is required to make characteristics thereof slightly different depending on color aberration.

Here, the image restoration filter of each color component has slightly different characteristics dependent on color aberration, and hence changes in filter coefficient of the FIG. 10A image restoration filter, illustrated in FIG. 10B, vary with each color component. The numbers of taps of the image restoration filter in the horizontal and vertical directions are not required to be equal, that is, the taps are not required to be squarely arrayed, and the arrangement of taps can be changed as desired only if convolution processing is taken into account.

Further, if image restoration filters are generated based on the OTF in which a linear component is eliminated from the PTF in advance, it is possible to generate image restoration filters that do not correct components of lateral chromatic aberration which is a parallel color shift. On the other hand, when eliminating the lateral chromatic aberration components in a spatial area, the PSF which is shifted in parallel is generated, and the generated PSF is subjected to Fourier transform. This makes it possible to similarly generate the OTF from which the components of lateral chromatic aberration have been eliminated. Then, by generating image restoration filters based on the OTF thus generated, it is possible to generate the image restoration filters that do not correct the components of lateral chromatic aberration which is a parallel color shift.

Note that in a case where image restoration processing is performed on an image of which lateral chromatic aberration has been corrected by shifting pixel signals in advance, the image restoration filters that do not correct components of lateral chromatic aberration, generated as described above, are used.

Figure 11A:
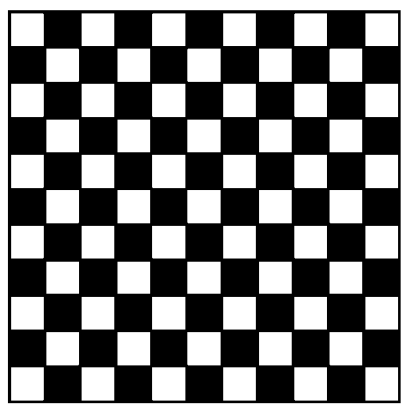
Figure 11B:
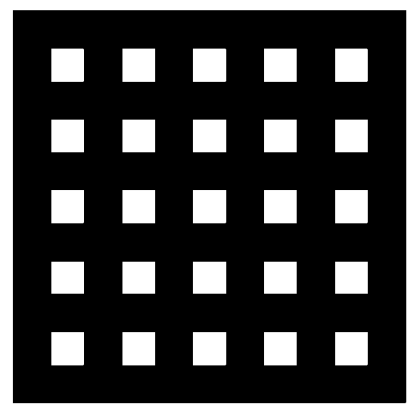

FIGS. 11A and 11B are diagrams useful in explaining image restoration filters used by the image restoration processor 111 shown in FIG. 4. FIG. 11A shows an image restoration filter to be applied to the G component, and FIG. 11B shows an image restoration filter to be applied to the R and B components.

FIGS. 11A and 11B show the image restoration filters to be applied to the RAW image having one color component for each pixel. The illustrated image restoration filters are each in a partially missing state in which a coefficient (filter coefficient) is provided only for each pixel having a target color component. In FIGS. 11A and 11B, locations (blocks) each having the filter coefficient are indicated by white, and the other locations each having 0 as the coefficient are indicated by black.

When performing image restoration for the three color components of R, G, and B, the image restoration filter shown in FIG. 11A is used as the image restoration filter to be applied to the G component. Further, the image restoration filter shown in FIG. 11B is used as the image restoration filter to be applied to the R and B components.

More specifically, the restoration filter application section (G) 1006 performs convolution processing for convoluting the G component plane shown in FIG. 6B with the image restoration filter shown in FIG. 11A. Further, the restoration filter application section (R) 1007 and the restoration filter application section (B) 1008 perform convolution processing for convoluting the R and B component planes shown in FIGS. 6C and 6D with the image restoration filter shown in FIG. 11B, respectively.

Note that if the G component of the RAW image is separated into a Gr component horizontally adjacent to the R component and a Gb component horizontally adjacent to the B component, image restoration for the Gr component and the Gb component is performed using an image restoration filter having the filter coefficients corresponding in number to the R component and the B component. When the G component is separated into the Gr component and the Gb component, although the effect of image restoration is sometimes reduced in the improvement of sharpness, differences in spatial frequency between the R component, the B component, the Gr component, and the Gb component are eliminated, and hence it is possible to expect an advantageous effect that a false color becomes difficult to be generated by image restoration.

Referring again to FIGS. 4 and 5, a restored pixel interpolation section (G) 1009 performs pixel interpolation for the G component subjected to image restoration (step S205). Further, in the step S205, a restored pixel interpolation section (R) 1010 and a restored pixel interpolation section (B) 1011 perform pixel interpolation processing for the R component and the B component, respectively, based on the G component after interpolation, which is output from the restored pixel interpolation section (G) 1009.

This interpolation processing performed by the restored pixel interpolation section (G) 1009, the restored pixel interpolation section (R) 1010, and the restored pixel interpolation section (B) 1011 is the same as interpolation processing performed by the pre-restored pixel interpolation section (G) 1001, the pre-restored pixel interpolation section (R) 1002, and the pre-restored pixel interpolation section (B) 1003.

If reduction of calculation load of interpolation processing is considered important also as to interpolation processing performed by the restored pixel interpolation section (R) 1010 and the restored pixel interpolation section (B) 1011, linear interpolation may be performed without using the G component after interpolation.

Then, a second color difference calculation section (R) 1012 calculates second color difference information (Cr) based on the G component plane after interpolation, which is output from the restored pixel interpolation section (G) 1009, and the R component plane after interpolation, which is output from the restored pixel interpolation section (R) 1010 (step S206). Further, in the step S206, a second color difference calculation section (B) 1013 calculates second color difference information (Cb) based on the G component plane after interpolation, which is output from the restored pixel interpolation section (G) 1009, and the B component plane after interpolation, which is output from the restored pixel interpolation section (B) 1011.

Processing performed by the second color difference calculation section (R) 1012 and the second color difference calculation section (B) 1013 in this step is the same as processing performed by the first color difference calculation section (R) 1004 and the first color difference calculation section (B) 1005. The second color differences (Cr and Cb) are calculated by the following equations (20) to (23):

$$C2r(x, y) = R(x, y) - G(x, y) \quad (20)$$

$$C2b(x, y) = B(x, y) - G(x, y) \quad (21)$$

$$C2r'(x, y) = \frac{\sum_{i=-k}^{k} \sum_{j=-k}^{k} C2r(x+i, y+j)}{(2k+1)^2} \quad (22)$$

$$C2b'(x, y) = \frac{\sum_{i=-k}^{k} \sum_{j=-k}^{k} C2b(x+i, y+j)}{(2k+1)^2} \quad (23)$$

In the equations (20) to (23), C2r and C2r' represent color differences of the R component with respect to the G component, and C2b and C2b' represent color differences of the B component with respect to the G component. Note that the second color difference information (Cr) indicates C2r and C2r', and the second color difference information (Cb) indicates C2b and C2b'.

Note that parameter k used in the equations (22) and (23) is set according to the F value and the sensitivity of the image pickup device, as described with reference to the equations (18) and (19).

Next, a pixel value adjustment section (R) 1014 determines whether or not the first color difference information (Cr) and the second color difference information (Cr) each satisfy predetermined determination conditions. Similarly, a pixel value adjustment section (B) 1015 determines whether or not the first color difference information (Cb) and the second color difference information (Cb) each satisfy predetermined determination conditions (step S207). That is, each of the pixel value adjustment section (R) 1014 and the pixel value adjustment section (B) 1015 determines whether or not adjustment of each pixel value for suppressing coloring is required.

In this determination, whether or not the color difference is increased or its sign is inverted is determined. In this step, the pixel value adjustment section (R) 1014 and the pixel value adjustment section (B) 1015 perform the following determination with respect to the R component and the B component, respectively. Then, if any of the determination conditions is satisfied (YES to the step S207), the pixel value adjustment section (R) 1014 and the pixel value adjustment section (B) 1015 perform pixel value adjustment for suppressing coloring with respect to pixels of the R component and the B component, respectively (step S208).

Determination conditions with respect to the R component

Determination condition 1: C1r'(x, y) and C2r'(x, y) have the same sign, and |C1r'(x, y)|<|C2r'(x, y)|

Determination condition 2: C1r'(x, y) and C2r'(x, y) have different signs

Determination conditions with respect to the B component

Determination condition 1: C1b'(x, y) and C2b'(x, y) have the same sign, and |C1b'(x, y)|<|C2b'(x, y)|

Determination condition 2: C1b'(x, y) and C2b'(x, y) have different signs

In pixel value adjustment for suppressing coloring performed in the step S208, a color difference before restoration is used in a case where the color difference is increased as described hereafter. On the other hand, if the sign of the color difference is inverted, the color difference is set to 0.

Pixel value adjustment with respect to the R component

If the determination condition 1 is satisfied (increase in the color difference), the pixel adjustment is performed by the following equation (24):

$$R(x,y)=G(x,y)+C1r(x,y) \quad (24)$$

If the determination condition 2 is satisfied (inversion in the sign of the color difference), the pixel adjustment is performed by the following equation (25):

$$R(x,y)=G(x,y) \quad (25)$$

Pixel value adjustment with respect to the B component

If the determination condition 1 is satisfied (increase in the color difference), the pixel adjustment is performed by the following equation (26):

$$B(x,y)=G(x,y)+C1b(x,y) \quad (26)$$

If the determination condition 2 is satisfied (inversion in the sign of the color difference), the pixel adjustment is performed by the following equation (27):

$$B(x,y)=G(x,y) \quad (27)$$

Next, a pixel value-adjusted pixel interpolation section 1016 performs pixel interpolation processing on the G component output from the restoration filter application section (G) 1006, the R component output from the pixel value adjustment section (R) 1014, and the B component output from the pixel value adjustment section (B) 1015 (step S209). Then, the image restoration processor 111 terminates the image restoration process.

Note that if neither the determination conditions 1 nor 2 is satisfied (NO to the step S207), the process directly proceeds to the step S209.

In the step S209, adaptive interpolation for generating an interpolated pixel using pixel information of the other surrounding color components is performed. This makes it possible to perform pixel interpolation processing mutually using the color components on which coloring suppression processing has been performed. Note that for pixel interpolation processing performed by the pixel value-adjusted pixel interpolation section 1016, it is possible to employ the same method as employed for pixel interpolation processing performed by the pre-restored pixel interpolation section (G) 1001.

Note that the OTF varies according to an angle of view (image height) of the image pickup optical system even under one photographing condition, and hence it is desirable to change image restoration processing for each of divided areas of the image according to the image height. In doing this, the image restoration filter is only required to be scanned on the image while performing convolution processing, and the image restoration filter may be sequentially changed for each area of the image. That is, the step S203 shown in FIG. 5 is performed on each target pixel of the image restoration components.

Although in the above-described example, application of the image restoration filter is described as the image restoration process, this is not limitative. For example, the image restoration process may be performed by combining the same with another process, such as a distortion correction process, a peripheral light amount correction process, and a noise reduction process.

Figure 12A:
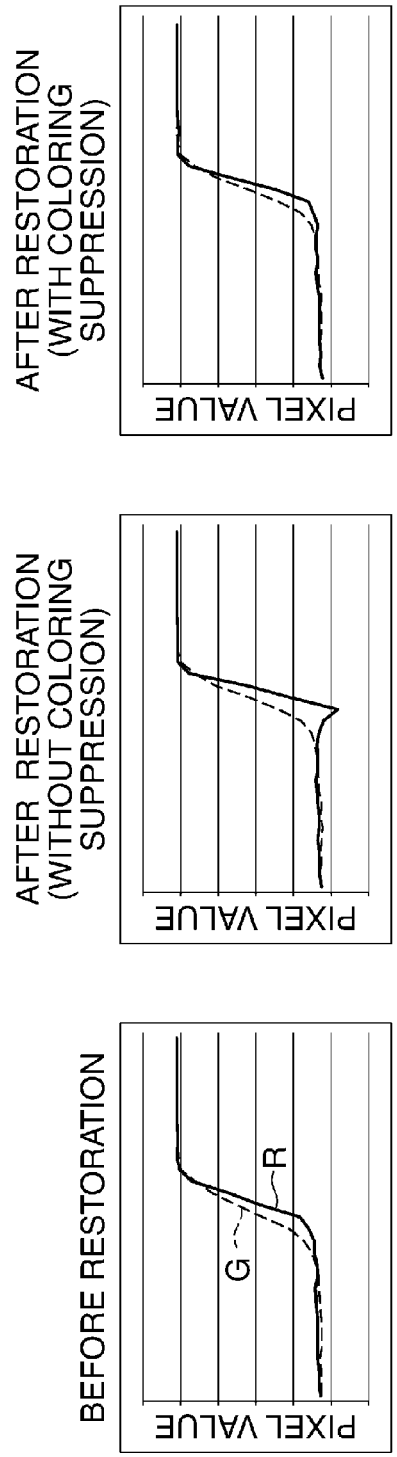
Figure 12B:
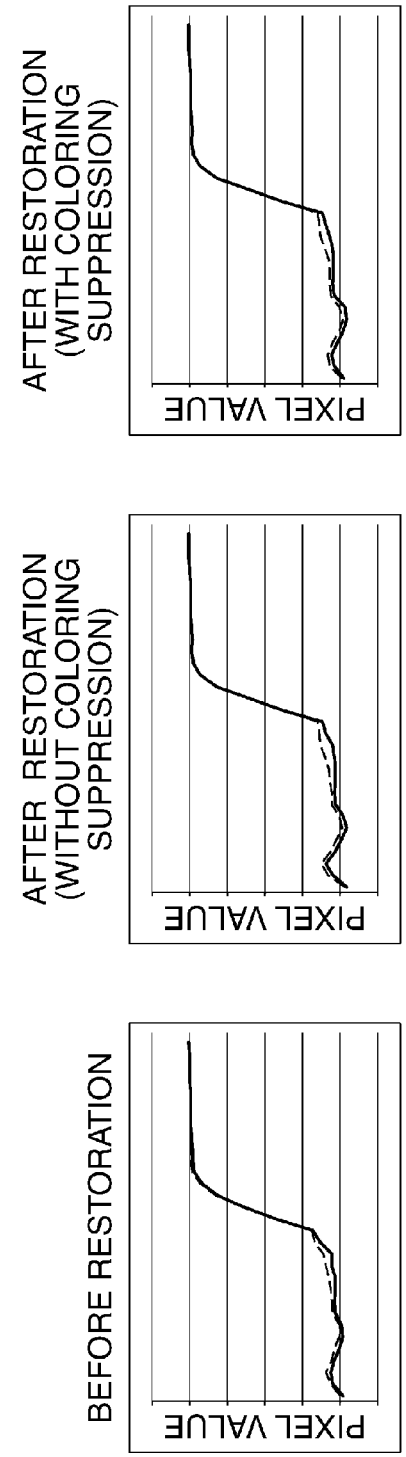

FIGS. 12A and 12B are diagrams useful in explaining changes in pixel value (signal value) indicative of brightness in an edge portion in a case where development processing is performed on an image subjected to the image restoration process, described with reference to FIG. 5 and an image not subjected to the image restoration process. FIG. 12A shows changes in brightness at a low sensitivity, and FIG. 12B shows changes in brightness at a high sensitivity.

FIG. 12A shows an example of a case where the aperture is opened and the sensitivity is low, and the image has less noise components which cause a change in the color tone when coloring suppression processing is performed in image restoration. In the illustrated example in FIG. 12A, the edge portion is an edge portion of an out-of-focue object, and with respect to the pixel value (signal value) of the edge portion without image restoration (no restoration), unless coloring suppression processing is performed, coloring in the edge portion is increased by performing image restoration.

Figure 13A:
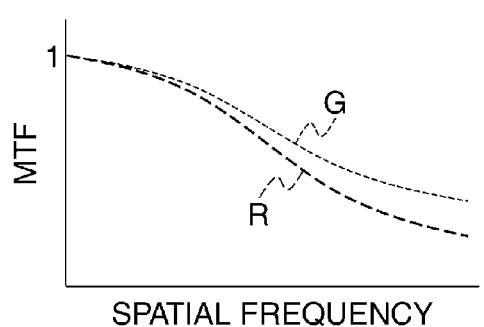
FIGS. 13A to 13E are diagrams useful in explaining a relationship between an MTF of the image pickup optical system and spatial frequency characteristics, in which FIGS. 13A to 13D each show a relationship between the MTF of the image pickup optical system and spatial frequency characteristics exhibited after applying the image restoration filters.
Figure 13B:
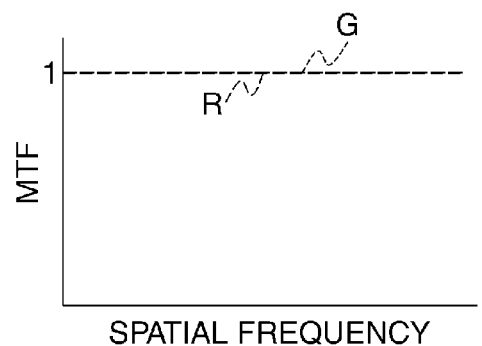
Figure 13C:
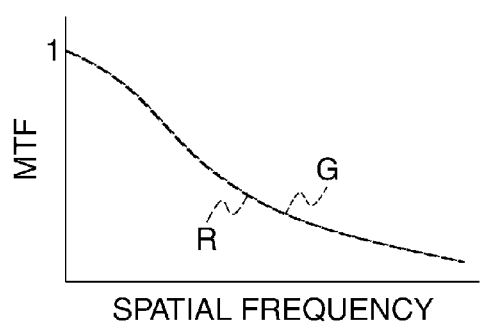
Figure 13D:
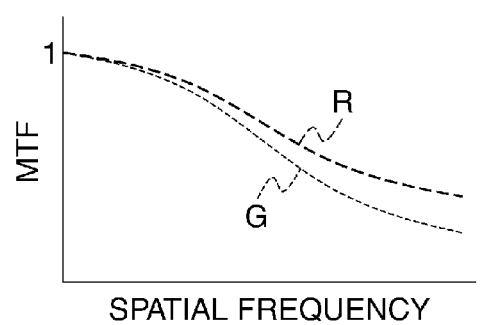
Figure 13E:
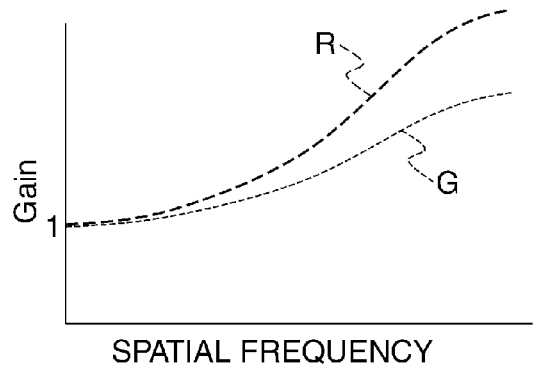

FIGS. 13A to 13E are diagrams useful in explaining a relationship between the MTF and spatial frequency characteristics. FIGS. 13A to 13D each show the relationship between the MTF of the image pickup optical system and the spatial frequency characteristics exhibited after applying the image restoration filters, and FIG. 13E shows an increase/decrease rate (restoration gain) of the MTF caused by applying the image restoration filters.

FIG. 13A shows the MTFs of the image pickup optical system 101 in an in-focus state, in which the R component is degraded more than the G component. FIG. 13B shows the MTFs obtained after applying the image restoration filters in the in-focus state, in which the G component and the R component are both have their MTF properly corrected, and coincide with each other.

More specifically, in the illustrated example in FIG. 13B, the MTFs shown in FIG. 13A are multiplied by the restoration gains shown in FIG. 13E, respectively, whereby the MTFs of the G component and the R component are both properly corrected and coincide with each other. The image restoration filter is designed to be capable of optimally performing image restoration processing with respect to an in-focus object, which makes it possible to properly perform image restoration processing in the in-focus state. Therefore, when in focus, blurs of the G component and the R component are properly eliminated, and color bleeding is also eliminated.

On the other hand, FIGS. 13C and 13D show the MTFs of the image pickup optical system 101 in an out-of-focus state, in which the G component and the R component both show different characteristics, compared with those shown in FIG. 13A. The edge portion shown in FIG. 12A corresponds to the MTFs shown in FIG. 13D.

When the MTFs shown in FIG. 13D are multiplied by the restoration gains shown in FIG. 13E, the R component is excessively corrected, and as a result, coloring occurs in the edge portion on which restoration processing has been performed, as described with reference to FIGS. 12A and 12B. This coloring is suppressed by performing the above-described image restoration process. More specifically, since the sensitivity is low, the parameter k is equal to 0, and hence coloring suppression can be sufficiently performed.

In the illustrated example in FIG. 12B, the sensitivity is high, and the RAW image has a lot of noise components. In this case, it can be said that image information obtained from the optical image formed on the image pickup device has been lost due to the noise components. Therefore, coloring occurring on the out-of-focus object, which is found when the sensitivity is low, has its degree reduced when the sensitivity is high. Further, coloring occurring in the edge portion is sometimes made unnoticeable by noise reduction processing performed in development processing.

That is, coloring occurring in an out-of-focus object tends to be less noticeable in the case of the high sensitivity, and hence when the sensitivity is high, it is possible to properly suppress coloring occurring in an out-of-focus object and the like, even by using an average value of color differences obtained from surrounding pixels.

FIG. 14 is a diagram showing moving averages of respective color differences before and after image restoration along one line in a predetermined area of an image having a lot of noise components.

It is assumed that a brightness of an object is low and a change in color is small in the predetermined area. It is known that when the image restoration process described with reference to FIG. 5 is performed, changes in color tone are reduced, compared with the state described with reference to FIG. 2E.

As described above, by using the average color difference information, obtained from the surrounding pixels, it is possible to attenuate the high-frequency components in the color difference information to thereby reduce changes in color difference information, caused by phase correction, in a case where a flat portion of an image has a lot of noise components. As a result, it is possible to perform proper coloring suppression processing on an image having a lot of noise components.

Here, the description has been given of the method of properly suppressing coloring by setting the parameter k according to an aperture value (F value) when the amount of phase correction of the OTF is large. In a case of a lens-interchangeable type single-lens reflex camera, the amount of phase correction is, in a strict sense, different depending on a mounted interchangeable lens. Therefore, by changing the adjustment of color difference information according to the parameter k depending on the interchangeable lens, a more desirable result can be obtained.

For example, parameters k suitable for the respective interchangeable lenses may be recorded in the camera, and one of the parameters k may be selected according to an interchangeable lens mounted on the camera.

Further, even with the same interchangeable lens, the amount of phase correction of the OTF varies with a focal length and a photographing distance. Therefore, the parameters k may be recorded in the camera according to respective photographing conditions, such as focal lengths and photographing distances. In this case, it is only required to empirically determine a proper parameter k according to a change in image quality, caused by phase correction, in advance.

FIGS. 15A to 15C are diagrams useful in explaining an example of a filter for changing a color difference bandwidth, in which FIG. 15A shows a first filter, FIG. 15B shows a second filter, and FIG. 15C shows a third filter.

Here, the color difference bandwidth is changed by applying a different one of the filters having coefficients shown in FIG. 15A to 15C to the color difference information. In this case, the above-described C1r' and C1b' are set by the following equations (28) and (29):

$$C1r'(x,y) = \text{LPF}(x,y) * C1r(x,y) \quad (28)$$

$$C1b'(x,y) = \text{LPF}(x,y) * C1b(x,y) \quad (29)$$

The color differences C2r' and C2b' are also similarly set. The filters shown in FIGS. 15A to 15C are low pass filters (LPF), and when the image pickup device is set to a high sensitivity, the LPF is convoluted with the color difference information according to an aperture value. That is, low pass filtering is performed on the color difference information according to an aperture value. More specifically, although in the equations (18), (19), (22), and (23), the average value of color differences is used, in low pass filtering, a different coefficient is used for convolution according to a distance from a pixel for which the color difference information is to be calculated.

The LPF shown in FIG. 15C is used when the aperture is more open. This attenuates the high-frequency components of the color difference information. Further, when the aperture is more closed, the amount of attenuation of the high-frequency components is adjusted by using the LPF shown in FIG. 15A or 15B.

As described above, by fixing the number of taps of the filter, it is possible to perform processing in which the size of an image area to be handled is fixed.

As described above, in the first embodiment of the present invention, the high-frequency components are attenuated according to the sensitivity and the aperture value of the image pickup device, which are the photographing conditions. This makes it possible to properly suppress coloring caused by image restoration processing.

Next, a description will be given of a camera as an image pickup apparatus equipped with an image processing apparatus according to a second embodiment of the present invention (hereafter referred to as "the camera according to the second embodiment). Note that the camera according to the second embodiment is the same in configuration as the camera shown in FIG. 3.

In the above-described first embodiment, coloring caused by image restoration is suppressed by attenuating the high-frequency components in the color difference information. In the second embodiment, coloring caused by image restoration is suppressed without attenuating the high-frequency components in the color difference information.

Figure 16:
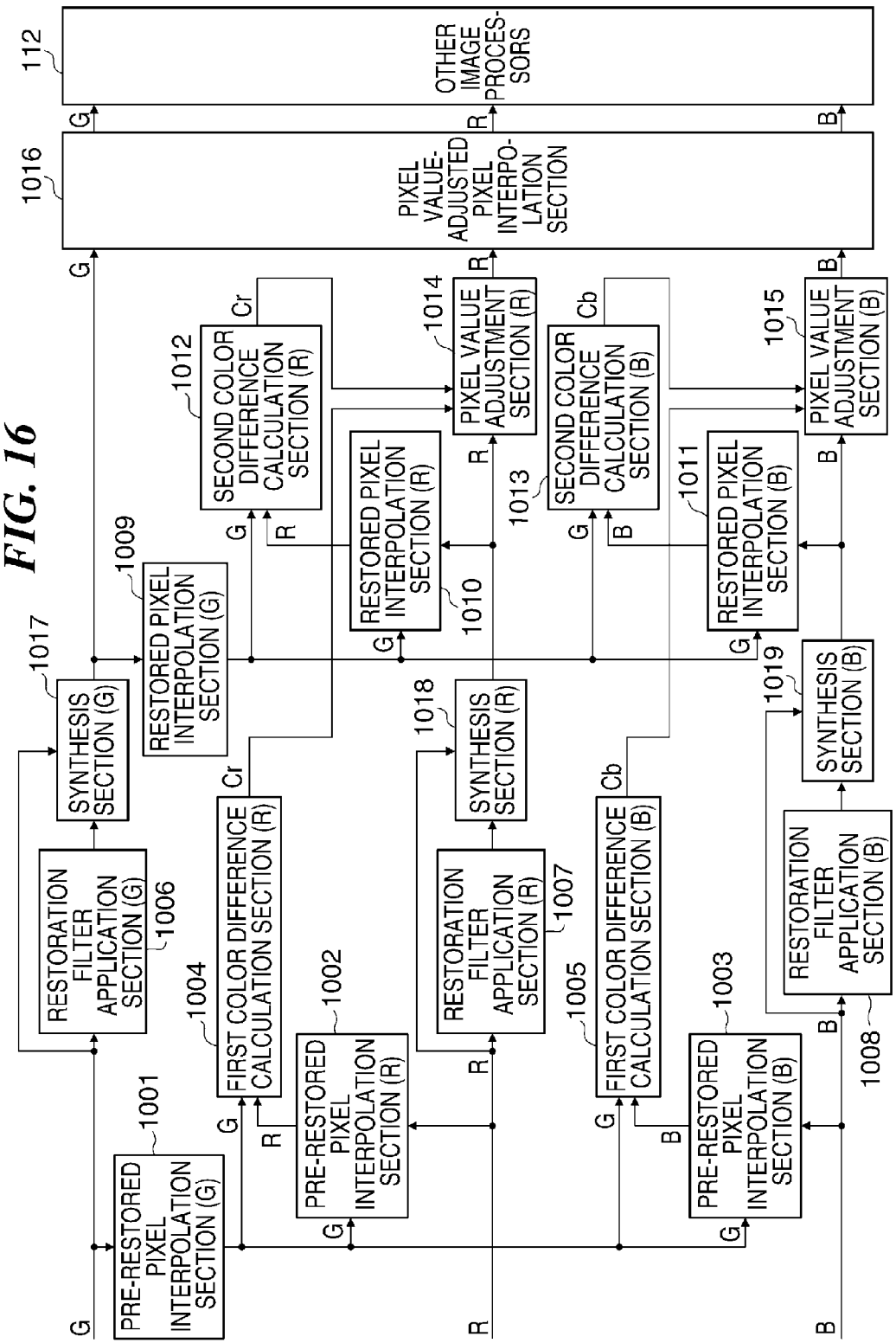
FIG. 16 is a block diagram of an example of an image restoration processor used in a digital camera as an image pickup apparatus equipped with an image processing apparatus according to a second embodiment of the present invention.

FIG. 16 is a block diagram of an example of the image restoration processor 111 used in the camera according to the second embodiment. The same components in FIG. 16 as those of the image restoration processor shown in FIG. 4 are denoted by the same reference numerals, and description thereof is omitted.

The image restoration processor 111 shown in FIG. 16 includes a synthesis section (G) 1017, a synthesis section (R) 1018, and a synthesis section (B) 1019. The G component and an output from the restoration filter application section (G) 1006 are input to the synthesis section (G) 1017. Further, the R component and an output from the restoration filter application section (R) 1007 are input to the synthesis section (R) 1018. Further, the B component and an output from the restoration filter application section (B) 1008 are input to the synthesis section (B) 1019.

The synthesis section (G) 1017, the synthesis section (R) 1018, and the synthesis section (B) 1019 perform synthesis processing as described hereinafter, and deliver outputs therefrom to the pixel value-adjusted pixel interpolation section 1016, the pixel value adjustment section (R) 1014, and the pixel value adjustment section (B) 1015, respectively.

Figure 17:
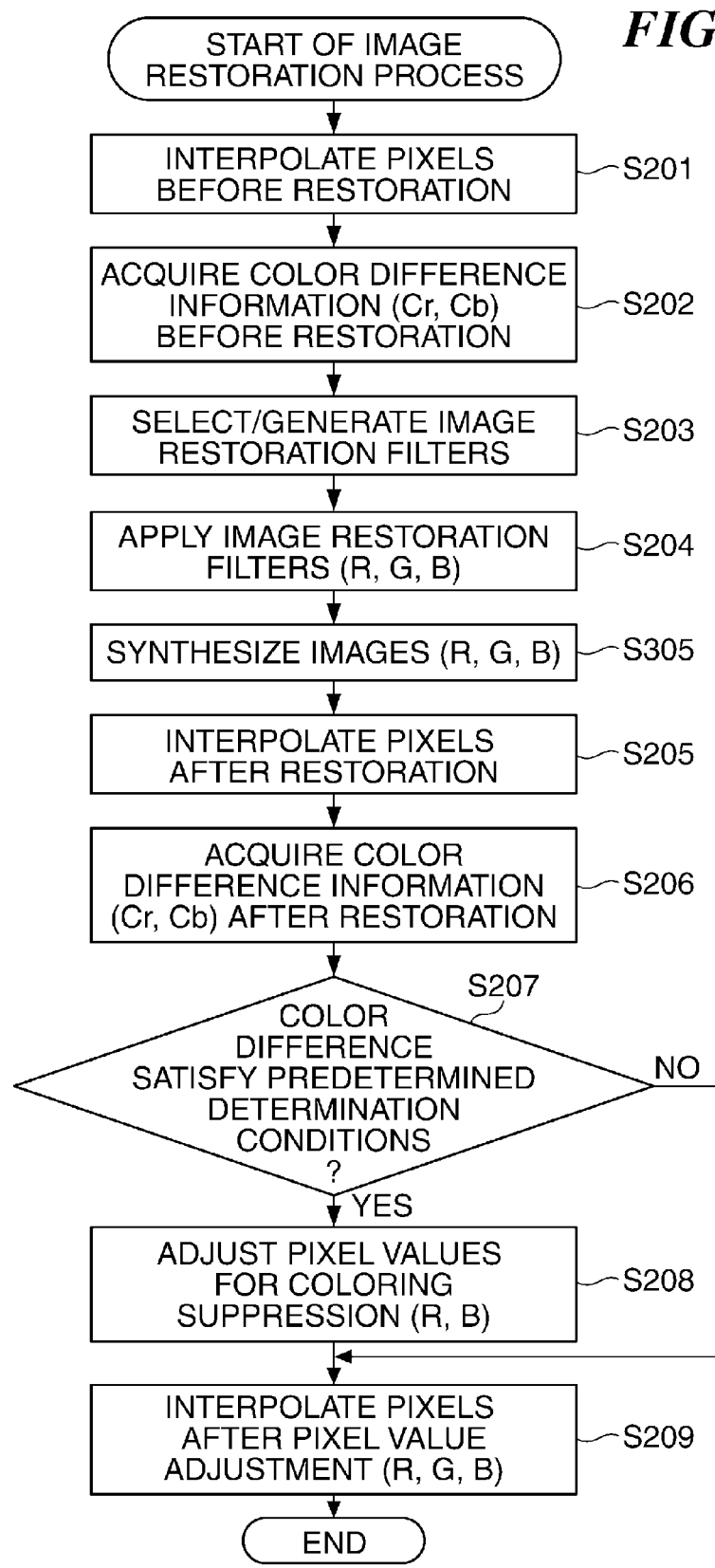
FIG. 17 is a flowchart of an image restoration process performed by the image restoration processor shown in FIG. 16.

FIG. 17 is a flowchart of an image restoration process performed by the image restoration processor 111 shown in FIG. 16. The same steps in FIG. 17 as those of the flowchart in FIG. 5 are denoted by the same step numbers. Further, in the step S203 in FIG. 17, the color differences C1r and C1b are calculated by the above-described equations (16) and (17).

Referring to FIGS. 16 and 17, after execution of the step S204, the synthesis section (G) 1017, the synthesis section (R) 1018, and the synthesis section (B) 1019 synthesize an image before image restoration processing and an image after image restoration processing, for the respective color components of R, G, and B (step S305). In synthesizing the images, the synthesis section (G) 1017, the synthesis section (R) 1018, and the synthesis section (B) 1019 perform image synthesis using the following equations (30), (31), and (32), respectively.

Note that M represents a synthesis parameter. Further, (x, y) represent coordinate values on the image, R0, G0, and B0 represent the respective color components before being subjected to image restoration processing, R1, G1, and B1 represent the respective color components after being subjected to image restoration processing, and R2, G2, and B2 represent the respective color components after synthesis.

$$G2(x,y) = (1-M) \times G0(x,y) + M \times G1(x,y) \quad (30)$$

$$R2(x,y) = (1-M) \times R0(x,y) + M \times R1(x,y) \quad (31)$$

$$B2(x,y) = (1-M) \times B0(x,y) + M \times B1(x,y) \quad (32)$$

The synthesis parameter M indicates a synthesis ratio, and when the synthesis parameter M is equal to 1, an image after restoration processing and an image after synthesis processing are equivalent to each other. On the other hand, as the synthesis parameter M is closer to 0, a ratio of use of the image before image restoration processing becomes higher.

Figure 18A:
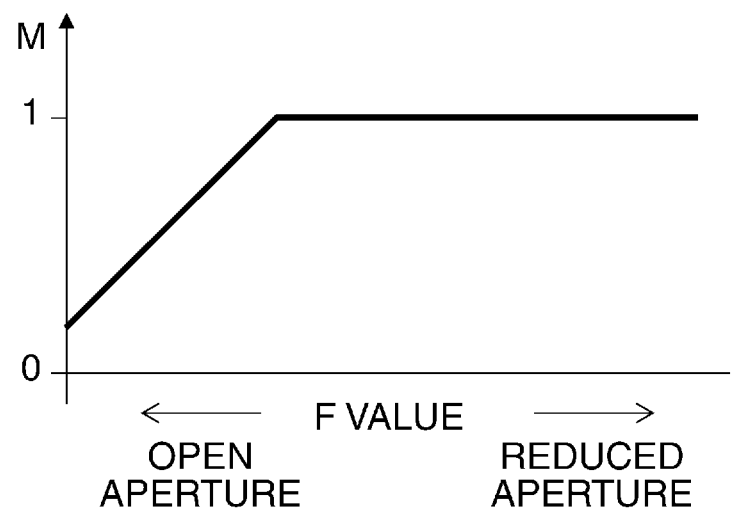
Figure 18B:
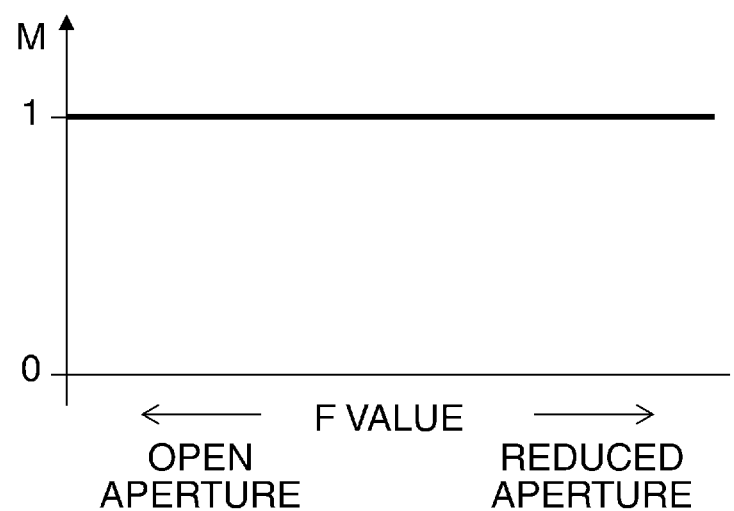

FIGS. 18A and 18B are diagrams useful in explaining a synthesis parameter set according to a sensitivity of the image pickup device, in which FIG. 18A shows changes in synthesis parameter set when the image pickup device is set to a high sensitivity, and FIG. 18B shows changes in synthesis parameter set when the image pickup device is set to a low sensitivity.

Referring to FIG. 18A, when the image pickup device is set to a high sensitivity, noise components are increased. In this case, the synthesis parameter M is changed according to an aperture value (F value) of the image pickup optical system. Then, when the F value is set to a smaller value, which makes the aperture more open, than a predetermined value, the synthesis parameter M gradually linearly reduces as the F value becomes smaller (the aperture is made more open). On the other hand, when the F value is set to a larger value, which makes the aperture more closed, than the predetermined value, the synthesis parameter M is held at 1.

As described hereinabove, if the amount of phase correction of the OTF is large in image restoration processing, it is impossible to perform proper coloring suppression processing on an image having a lot of noise components. Further, in general, an influence of lateral aberration including asymmetric coma aberration or the like tends to be larger as the aperture is more open. For this reason, the effect of phase correction in image restoration processing also tends to be larger as the aperture is more open.

Therefore, the synthesis parameter M is set according to the aperture value (F value), and the effect of image restoration is changed according to the aperture.

Note that in a case where an influence of noise components is small as a result of setting the image pickup device to a low sensitivity, as shown in FIG. 18B, the synthesis parameter M is always set to 1 regardless of the F value. However, among compact camera units, there is a type in which an influence of noise components is not reduced even when the image pickup device is set to a low sensitivity. In this case, it is only required that the parameter M is set according to the F value irrespective of the sensitivity of the image pickup device.

Then, the above-described steps S205 and S206 are executed. In the step S206 in FIG. 17, the color difference information is calculated by the following equations (33) and (34). Note that C2r represents a color difference of the R component with respect to the G component, and C2b represents a color difference of the B component with respect to the G component.

$$C2r(x,y)=R2(x,y)-G2(x,y) \quad (33)$$

$$C2b(x,y)=B2(x,y)-G2(x,y) \quad (34)$$

Then, in the step S207 in FIG. 17, it is determined whether or not pixel value adjustment for suppressing coloring is required, but in this step, the following determination conditions are used.

Determination conditions with respect to the R component

Determination Condition 1:
C1r(x, y) and C2r(x, y) have the same sign, and |C1r(x, y)|<|C2r(x, y)|.

Determination Condition 2:
C1r(x, y) and C2r(x, y) have different signs.

Determination conditions with respect to the B component

Determination Condition 1:
C1b(x, y) and C2b(x, y) have the same sign, and |C1b(x, y)|<|C2b(x, y)|.

Determination Condition 2:
C1b(x, y) and C2b(x, y) have different signs.

In the step S208 in FIG. 17, pixel value adjustment is performed in the following manner:

Pixel value adjustment for the R component is performed based on the above-described equations (24) and (25). Further, pixel value adjustment for the B component is performed based on the above-described equations (26) and (27).

After execution of the step S208, the step S209 is executed in a manner described with reference to FIG. 5.

Figure 19:
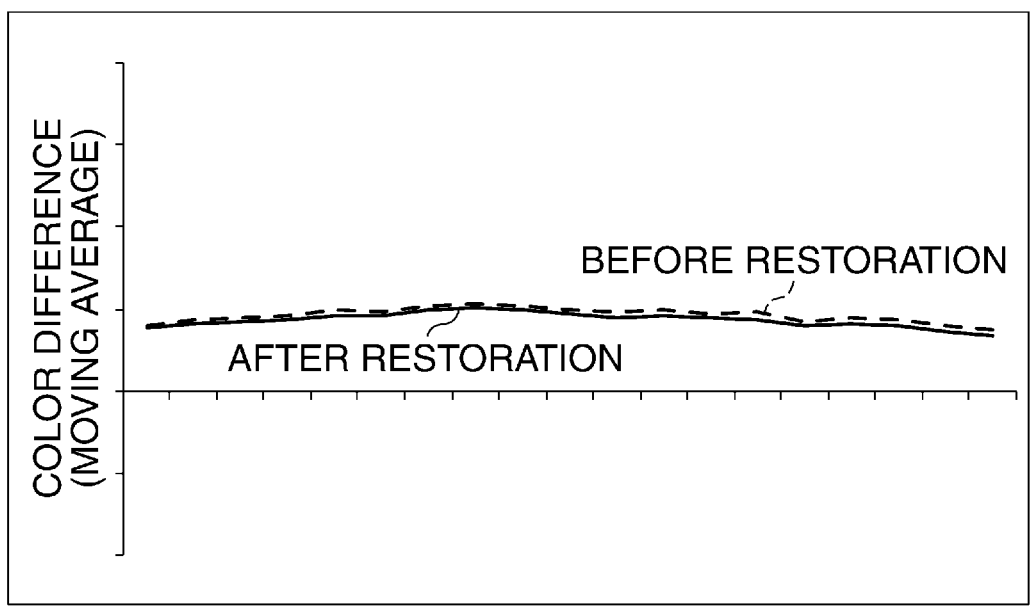
FIG. 19 is a diagram showing moving averages of respective color differences before and after image restoration along one line in a predetermined area of an image which is photographed by the digital camera as the image pickup apparatus equipped with the image processing apparatus according to the second embodiment and has a lot of noise components.

FIG. 19 is a diagram showing moving averages of respective color differences before and after image restoration along one line in a predetermined area of an image having a lot of noise components, in the camera according to the second embodiment.

It is assumed that a brightness of an object is low and a change in color is small in the predetermined area. It is known from FIG. 19 that by performing the image restoration process described with reference to FIG. 17, changes in color tone are reduced, compared with the state described with reference to FIG. 2E.

As described above, by setting the synthesis ratio according to the F value and the ISO sensitivity, it is possible to perform proper coloring suppression processing also in an image having a lot of noise components.

In a case where photographing is performed with a high sensitivity, information of details of an image tends to be lost due to an influence of noise components. Further, it is desirable that the restoration filter for use in image restoration processing is generated, by taking into account amplification of the noise components. However, it is difficult to completely separate a degraded image caused by aberration of the image pickup optical system from noise components, and hence the noise components are amplified by image restoration processing. Therefore, by employing the above-described method, although the effect of image restoration processing is small, it is possible to properly perform coloring suppression.

In the above-described second embodiment, the description has been given of the method of properly suppressing coloring in a case where the amount of phase correction of the OTF is large, by setting the synthesis parameter M according to an aperture value (F value). In the case of a lens-interchangeable type single-lens reflex camera, the amount of phase correction is, in a strict sense, different depending on a interchangeable lens mounted thereon. Therefore, by changing the adjustment of color difference information based on the synthesis parameter M, according to an interchangeable lens, a more desirable result can be obtained.

For example, by recording the synthesis parameters M suitable for respective interchangeable lenses in the camera, a synthesis parameter M may be selected according to an interchangeable lens mounted on the camera.

Further, even with the same interchangeable lens, the amount of phase correction of the OTF varies with a focal length and a photographing distance. Therefore, the synthesis parameter M may be recorded in the camera according to the interchangeable lens and the photographing conditions, such as a focal length and a photographing distance. In this case, it is only required to empirically determine a proper synthesis parameter M according to a change in image quality, caused by phase correction, in advance.

As described above, in the second embodiment of the present invention, the synthesis ratio at which an image before restoration processing and an image after restoration processing is synthesized is changed according to the sensitivity and the aperture value of the image pickup device, which are photographing conditions. Then, pixel values of the synthesized image are corrected based on a color difference before being subjected to image restoration and a color difference after being subjected to image restoration. This makes it possible to properly suppress coloring caused by image restoration processing.

As is clear from the above description, in the example shown in FIGS. 4 and 16, the pre-restored pixel interpolation section (G) 1001, the pre-restored pixel interpolation section (R) 1002, the pre-restored pixel interpolation section (B) 1003, the first color difference calculation section (R) 1004, and the first color difference calculation section (B) 1005 function as a first feature amount calculation unit.

Further, the restoration filter application section (G) 1006, the restoration filter application section (R) 1007, and the restoration filter application section (B) 1008 function as an image restoration processing unit. Further, the restored pixel interpolation section (G) 1009, the restored pixel interpolation section (R) 1010, the restored pixel interpolation section (B) 1011, the second color difference calculation section (R) 1012, and the second color difference calculation section (B) 1013 function as a second color feature amount calculation unit. Further, the pixel value adjustment section (R) 1014 and the pixel value adjustment section (B) 1015 function as a correction unit. Further, the first color difference calculation section (R) 1004, and the first color difference calculation section (B) 1005, the second color difference calculation section (R) 1012, and the second color difference calculation section (B) 1013 function as an attenuation unit. Further, the synthesis section (G) 1017, the synthesis section (R) 1018, and the synthesis section (B) 1019 function as a synthesis unit.

Further, a control method based on the functions of the above-described embodiments may be caused to be executed by the image processing apparatus which receives a RAW image photographed by the camera and performs image restoration processing on the received RAW image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2015-096510 filed May 11, 2015 which is hereby incorporated by reference herein in its entirety.

What is claimed is:

1. An image processing apparatus that restores an image quality of an image obtained based on an optical image formed on an image pickup device via an image pickup optical system, from degradation, comprising:
   a first color feature amount calculation unit configured to calculate a feature amount of a color of a pixel in the image before a predetermined restoration processing, as a first color feature amount;
   an image restoration processing unit configured to perform the predetermined restoration processing on the image, using an image restoration filter;
   a second color feature amount calculation unit configured to calculate a feature amount of a color of a pixel in an image after the predetermined restoration processing, which is output from said image restoration processing unit, as a second color feature amount;
   an attenuation unit configured to attenuate high-frequency components included in the first color feature amount and the second color feature amount according to a photographing condition at a time of photographing of the image; and
   a correction unit configured to correct a pixel value in the image after the predetermined restoration processing, based on the first color feature amount and the second color feature amount of which the high-frequency components are attenuated by said attenuation unit.

2. The image processing apparatus according to claim 1, wherein said attenuation unit averages the first color feature amounts obtained from one pixel and pixels surrounding the one pixel, respectively, and averages the second color feature amounts obtained from the one pixel and the pixels surrounding the one pixel, respectively.

3. The image processing apparatus according to claim 2, wherein said attenuation unit changes a size of an area including the surrounding pixels according to an aperture value which is the photographing condition.

4. The image processing apparatus according to claim 2, wherein said attenuation unit sets a size of an area including the surrounding pixels according to a sensitivity of the image pickup device, which is the photographing condition.

5. The image processing apparatus according to claim 1, wherein said attenuation unit performs low pass filtering using the first color feature amounts obtained from one pixel and pixels surrounding the one pixel, respectively, and performs low pass filtering using the second color feature amounts obtained from the one pixel and the pixels surrounding the one pixel, respectively.

6. The image processing apparatus according to claim 1, wherein the first color feature amount indicates a color difference which is a difference in signal value between a first color in the image before the predetermined restoration processing as a reference color, and each of a second color and a third color in the image before the predetermined restoration processing, and the second color feature amount indicates a color difference which is a difference in signal value between the first color in the image after the predetermined restoration processing as a reference color, and each of a second color and a third color in the image after the predetermined restoration processing.

7. The image processing apparatus according to claim 6, wherein the first color, the second color, and the third color are green, red, and blue, respectively.

8. The image processing apparatus according to claim 6, wherein said first color feature amount calculation unit calculates the first color feature amount after performing a predetermined interpolation processing on the first color, the second color, and the third color in the image before the predetermined restoration processing, and said second color feature amount calculation unit calculates the second color feature amount after performing the predetermined interpolation processing on the first color, the second color, and the third color in the image after the predetermined restoration processing.

9. An image processing apparatus that restores an image quality of an image obtained based on an optical image formed on an image pickup device via an image pickup optical system, from degradation, comprising:
- a first color feature amount calculation unit configured to calculate a feature amount of a color of a pixel in the image before a predetermined restoration processing, as a first color feature amount;
- an image restoration processing unit configured to perform the predetermined restoration processing on the image, using an image restoration filter;
- a synthesis unit configured to generate a synthesized image by synthesizing the image before the predetermined restoration processing and an image after the predetermined restoration processing, which is output from said image restoration processing unit, according to a photographing condition at a time of photographing of the image;
- a second color feature amount calculation unit configured to calculate a feature amount of a color of a pixel in the synthesized image as a second color feature amount; and
- a correction unit configured to correct a pixel value in the synthesized image based on the first color feature amount and the second color feature amount.

10. The image processing apparatus according to claim 9, wherein said synthesis unit changes a synthesis ratio at which the image before the predetermined restoration processing and the image after the predetermined restoration processing are synthesized, according to an aperture value which is the photographing condition.

11. The image processing apparatus according to claim 9, wherein said synthesis unit sets a synthesis ratio at which the image before the predetermined restoration processing and the image after the predetermined restoration processing are synthesized, according to a sensitivity of the image pickup device, which is the photographing condition.

12. A method of controlling an image processing apparatus that restores an image quality of an image obtained based on an optical image formed on an image pickup device via an image pickup optical system, from degradation, comprising:
- calculating a feature amount of a color of a pixel in the image before a predetermined restoration processing, as a first color feature amount;
- performing the predetermined restoration processing on the image, using an image restoration filter;
- calculating a feature amount of a color of a pixel in an image after the predetermined restoration processing, as a second color feature amount;
- attenuating high-frequency components included in the first color feature amount and the second color feature amount according to a photographing condition at a time of photographing of the image; and
- correcting a pixel value in the image after the predetermined restoration processing, based on the first color feature amount and the second color feature amount of which the high-frequency components are attenuated by said attenuating.

13. A method of controlling an image processing apparatus that restores an image quality of an image obtained based on an optical image formed on an image pickup device via an image pickup optical system, from degradation, comprising:
- calculating a feature amount of a color of a pixel in the image before a predetermined restoration processing, as a first color feature amount;
- performing the predetermined restoration processing on the image, using an image restoration filter;
- generating a synthesized image by synthesizing the image before the predetermined restoration processing and an image after the predetermined restoration processing, according to a photographing condition at a time of photographing of the image;
- calculating a feature amount of a color of a pixel in the synthesized image as a second color feature amount; and
- correcting a pixel value in the synthesized image based on the first color feature amount and the second color feature amount.

14. A non-transitory computer-readable storage medium storing a computer-executable program for executing a method of controlling an image processing apparatus that restores an image quality of an image obtained based on an optical image formed on an image pickup device via an image pickup optical system, from degradation,
wherein the method comprises:
- calculating a feature amount of a color of a pixel in the image before a predetermined restoration processing, as a first color feature amount;
- performing the predetermined restoration processing on the image, using an image restoration filter;
- calculating a feature amount of a color of a pixel in an image after the predetermined restoration processing, as a second color feature amount;
- attenuating high-frequency components included in the first color feature amount and the second color feature amount according to a photographing condition at a time of photographing of the image; and
- correcting a pixel value in the image after the predetermined restoration processing, based on the first color feature amount and the second color feature amount of which the high-frequency components are attenuated by said attenuating.

15. A non-transitory computer-readable storage medium storing a computer-executable program for executing a method of controlling an image processing apparatus that restores an image quality of an image obtained based on an optical image formed on an image pickup device via an image pickup optical system, from degradation,
wherein the method comprises:
- calculating a feature amount of a color of a pixel in the image before a predetermined restoration processing, as a first color feature amount;
- performing the predetermined restoration processing on the image, using an image restoration filter;
- generating a synthesized image by synthesizing the image before the predetermined restoration processing and an image after the predetermined restoration processing, according to a photographing condition at a time of photographing of the image;
- calculating a feature amount of a color of a pixel in the synthesized image as a second color feature amount; and
- correcting a pixel value in the synthesized image based on the first color feature amount and the second color feature amount.

* * * * *